United States Patent

Galvin et al.

[11] Patent Number: 6,066,265
[45] Date of Patent: May 23, 2000

[54] MICROMACHINED SILICON PROBE FOR SCANNING PROBE MICROSCOPY

[75] Inventors: Gregory J. Galvin, Ithaca; Timothy J. Davis, Trumansburg, both of N.Y.

[73] Assignee: Kionix, Inc., Ithaca, N.Y.

[21] Appl. No.: 08/665,369

[22] Filed: Jun. 19, 1996

[51] Int. Cl.[7] .................................................. H01L 21/306
[52] U.S. Cl. .................................................. 216/2; 216/62
[58] Field of Search .................................. 216/2, 11, 62, 216/83; 250/306, 492.2

[56] References Cited

U.S. PATENT DOCUMENTS

| | | |
|---|---|---|
| 4,968,585 | 11/1990 | Albrecht et al. . |
| 5,066,358 | 11/1991 | Quate et al. . |
| 5,116,462 | 5/1992 | Bartha et al. . |
| 5,201,992 | 4/1993 | Marcus et al. ............................ 216/2 |
| 5,242,541 | 9/1993 | Bayer et al. . |
| 5,282,924 | 2/1994 | Bayer et al. . |
| 5,286,343 | 2/1994 | Hui . |
| 5,313,451 | 5/1994 | Yagi et al. . |
| 5,354,985 | 10/1994 | Quate . |
| 5,396,066 | 3/1995 | Ikeda et al. . |
| 5,455,419 | 10/1995 | Bayer et al. ............................ 250/306 |

OTHER PUBLICATIONS

Kenneth E. Bean, "Anisotropic Etching of Silicon", IEEE Trans. Devices, vol. ED–25, No. 10, pp. 1185–1193, Oct. 1978.

Xian–Ping Wu, "Compensating Corner Undercutting in Anisotropic Etching of (100) Silicon", Sensors and Actuator, vol. 18, pp. 207–215, 1989.

G.K. Mayer, "Fabrication of Non–Underetched Convex Corners in Anisotropic Etching of (100)–Silicon in Aqueous KOH with Respect to Novel Micromechanic Element", J. Elecrochem, Soc. vol. 137, No. 12, pp. 3947–3951, Dec. 1990.

H.L. Offereins, "Methods for the Fabrication of Convex Corners in Anisotropic Etching of (100) Silicon in Aqueous KOH", Sensors and Actuators A, pp. 9–13, 1991.

Junji Itoh, "Fabricationn of an Ultrasharp and High–Aspect–Ratio Microprobe with a Silicon–on–Insulator Wafer for Scanning Force Microscopy", pp. 331–334, Dec. 1994.

Andrew Pember, "Study of the Effect of Boron Doping on the Aging of Micromachined Silicon Cantilevers", Appl. Physics, Lett. 66, pp. 577–579, Jan. 1995.

J.A.Dagata, "Device Fabrication by Scanned Probe Oxidation", Science, vol. 270, pp. 1625–1641, Dec. 8, 1995.

S.R.Manalis, "Atomic Force Microscopy of High Speed Imaging Using Cantilevers with an Integrated Actuator and Sensor", Appl. Physics Lett. 68, pp. 871–873, Feb. 5, 1996.

(List continued on next page.)

*Primary Examiner*—Kiet T. Nguyen
*Attorney, Agent, or Firm*—Jones, Tullar & Cooper PC

[57] ABSTRACT

A microprobe having a mounting block and a silicon cantilever with an integral silicon tip is produced from a SOI wafer having a bottom layer of silicon substrate, a middle layer of insulating material, and a top layer of silicon substrate. The top layer is coated with a first layer of masking material. The bottom layer is masked and etched to form a bottom section of the mounting block. The middle layer provides an etch stop for precise control of the bottom layer etch. A tip mask is formed by partially etching the first layer of masking material. A front side mask is formed by further etching of the first layer. The front side mask defines a cantilever pattern and a top mounting block pattern. The cantilever pattern and the top mounting block pattern are transferred into the top layer by etching the top layer to a depth corresponding to a desired cantilever thickness. Further etching of the top layer forms a tip column and releases the cantilever and a top section of the mounting block from the top layer. The middle layer acts as an etch stop for precise control of the cantilever thickness and tip height. The tip column is then oxidized to form the integral silicon tip.

21 Claims, 13 Drawing Sheets

OTHER PUBLICATIONS

J.Lai, "Thermal Detection of Device Failure by Atomic Force Microscopy", IEEE Trans. Devices, vol. 16, No. 7, Jul. 1995.

R.B.Protsch, "Magnetic Force Microscopy of the Submicron Magnetic Assembly in a Magnetotactic Bacterium", Appl. Physics Lett 66, pp. 2852–2854, May 8, 1995.

S.C.Minne, "Parallel Atomic Force Microscopy using Cantilevers with Integrated Piezoresistive Sensors and Integrated Piezoeletric Actuators", Appl. Physics Lett. 67, pp. 3918–3920, Dec. 25, 1995.

Joseph E. Griffith, "Dimensional Metrology with Scanning Probe Microscopes", J.Appl.Physics 74, pp. R83–R109, Nov. 1, 1993.

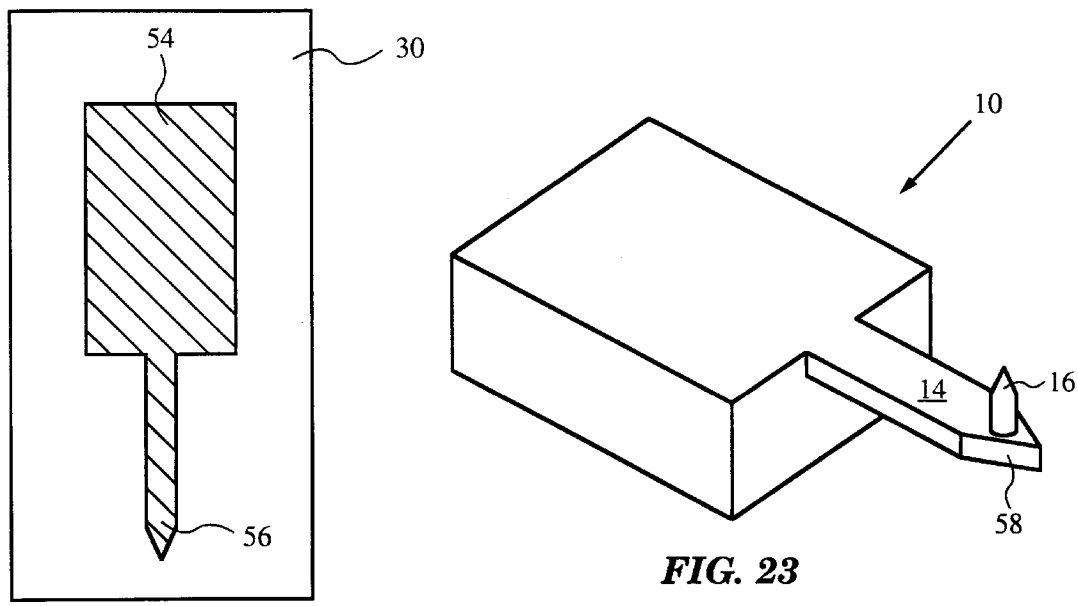
FIG. 22
FIG. 23
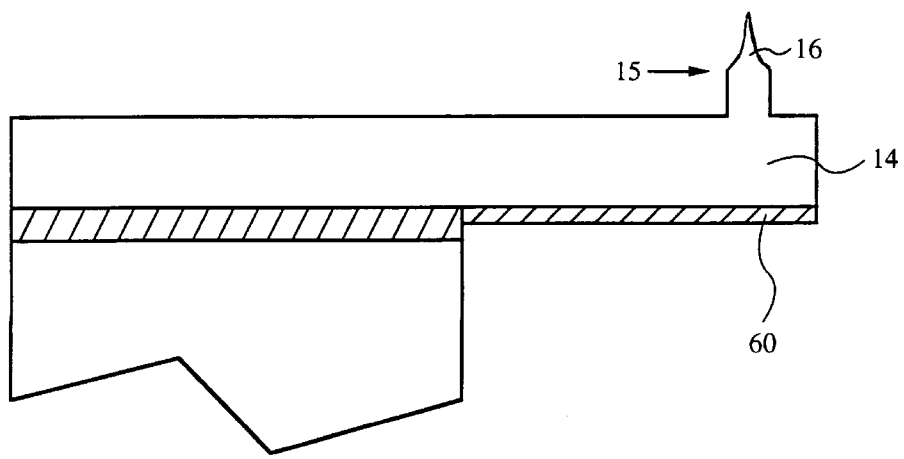
FIG. 24

MICROMACHINED SILICON PROBE FOR SCANNING PROBE MICROSCOPY

BACKGROUND OF THE INVENTION

The field of the invention relates generally to a probe for imaging or for effecting change in state at the atomic and near atomic level. In particular, the field of the invention relates to a monolithic probe for scanning probe microscopy applications, such as atomic force microscopy, as well as field emission tips, or the like, for effecting a change in state at the atomic level, and to a method for making such a probe in a reproducible, high volume manner.

Scanning Probe Microscopy (SPM) is used to describe many different methods which use a force interaction between a nanometer size point on a tip and a sample surface to physically sense forces associated with a surface and to image that surface with subnanometer resolution. This includes atomic force microscopy (AFM), magnetic force microscopy (MFM), scanning tunneling microscopy (STM), scanning thermal microscopy (SThM), and like methods. A related aspect of SPM also uses a nanometer size tip such as an AFM or like tip to emit electrons for effecting a switching phenomenon, such as a change of state, change of phase, or localized change in resistivity or optical property at or near the surface of a material at the atomic scale. This has been used to demonstrate that it is now possible to write information on a surface using single atoms. In one application, this has been done by positioning individual atoms adsorbed on a single crystal metal surface by means of a scanning tunneling microscope tip assembly.

The most critical part of any SPM is the probe. A probe typically comprises a mounting block, cantilever, and a tip assembly depending from the cantilever. The tip assembly further comprises a high aspect ratio column and a tip having substantially atomic sharpness disposed on the distal end of the column. The tip of the tip assembly follows the surface to be imaged, and in most instances, moves up or down due to the tip interacting in some manner with atoms on the surface being imaged. In many SPM applications, the deflection of the cantilever is used to measure the interaction between the tip and the sample being scanned. The deflection of the tip is translated by techniques which are well known into an image of the surface. Other SPM applications utilize changes in resonant frequency or electrical current to measure interaction between the tip and the sample.

Various techniques of scanning probe microscopy exist. Each technique has particular requirements that the probe must meet to achieve the desired objective of creating an accurate image of a target surface, or properties of that surface, with substantially atomic resolution.

AFM measures variations in the repulsive forces between the atoms on the surface to be imaged and the point of the tip of a tip assembly, which point is less than about 30 nanometers in diameter (i.e. it is "atomically sharp", meaning it is able to resolve images at an atomic level). The principle of atomic force microscopy (AFM) operation can be applied to measure a variety of forces and image those forces, including ionic repulsion, van der Waals forces, capillary, electrostatic, magnetic and frictional forces. A major impact of AFM can be expected to be made in many different research fields such as biology, electronics, and condensed matter physics. For example, magnetic force microscopy, an AFM technique, has now become an established experimental technique for the study of surface magnetic properties.

One technique for AFM uses a tip assembly in a non-contact mode for imaging a sample surface. In the non-contact mode, the tip is maintained at a distance of approximately 50–150 Å above the surface. This is necessary in situations in which tip contact may alter the sample surface. The interaction force between the tip and the sample surface being imaged causes a measurable change in the cantilever status, such as deflection or shift in resonant frequency. Several techniques have been developed to detect the interaction force between the tip and sample.

The most straightforward technique detects the force by measuring the static deflection of the cantilever, such as by an optical interferometer or by an integrated strain gauge such as a piezoresister (see for example Minne et. al., APL 67, Dec. 25, 1995). Significantly greater sensitivity to extremely small forces such as van der Waals forces, or the like, can be obtained by exciting the cantilever to mechanical resonance and measuring changes in the resonant frequency. In this method, a change in the resonant frequency of the cantilever occurs due to atomic force interactions between the tip and the sample as the tip approaches the sample. In another technique, a change in the resonant frequency of the cantilever is detected by keeping the excitation frequency constant and measuring a change in the vibration amplitude of the cantilever using a sensitive laser heterodyne probe. Thus, the resonant frequency of the cantilever is one critical parameter that must be carefully controlled in order to consistently image surfaces.

An atomic force microscope also can be used as a probe for tracking ultra high speed pulses in microelectronic devices. In this application, the AFM tip stays about 2 Å above the sample surface. The tip is kept at that position by a gentle downward pressure exerted by the cantilever and a quantum mechanical repulsive force that prevents the tip from coming closer to the target surface. A stream of voltage pulses are applied to the tip and to the device under test. The stream of pulses to the tip enable the AFM to be used as an extremely fast mixer or sampler. Sampling is necessary because the cantilever cannot vibrate fast enough to keep up with the voltage pulses. This enables a researcher to take stroboscopic like images of waveforms. Very short pulses to the AFM tip can freeze the action of a high speed waveform. The application of signal mixing utilizes pulses up to 20 GHz and sampling with 100 picosecond time resolution. This enables a researcher to create logic maps of ultra high speed nano scale circuits by scanning their topographies and voltage characteristics at the same time.

In the magnetic force microscope (MFM), a magnetic tip is mounted on a flexible cantilever and is used to image magnetic field patterns. The magnetic dipole of the tip interacts with the stray magnetic fields from a sample surface. Stray magnetic fields exert a force on the magnetized tip. The gradient of stray magnetic fields alters the resonant frequency of the cantilever. The change in resonant frequency is used to provide information regarding the sample surface.

The shape and magnetic properties of the tip used in MFM are critical to obtaining a quantative measure of the sample surface of magnetic properties. See for example Proksch et al., APL 66, May 8, 1995, p. 2582.

In STM applications, the tip is held at a constant tunneling current by maintaining a constant vertical height from the image to be scanned. A constant vertical height is maintained by moving the tip assembly up or down on the Z-axis. Movement of the tip is therefore achieved by external control and not by a force directly acting between the tip and the surface.

A scanning thermal (SThM) probe can be used to profile atomic features on both insulating and conducting crystals, or the like. The scanning thermal probe comprises a thermal sensor, such a thermocouple, disposed at the apex of a probe tip. When a constant current is passed through the thermocouple junction, the thermocouple heats up to an equilibrium temperature above the ambient value. If the tip now approaches a sample surface (an insulator, conductor or even a liquid) it cools down due to heat transfer from the tip to the sample. The tip temperature which is detected by the thermocouple then can used to control tip-spacing in much the same way as a tunneling current is used in a STM as the tip is scanned across the surface. When the tip is vibrated by a few tens of angstroms (Å) in the vertical direction, the ac change in the thermoelectric voltage is used as a monitor of the tip-sample spacing. This renders the system immune to ambient temperature variations caused by room temperature fluctuations and air currents in the vicinity of the probe tip.

A SThM probe can also be used to measure surface feature temperatures or thermal conductivities with high spatial resolution. See for example Lai et al., "Thermal Detection of Device Failure by Atomic Force Microscopy," IEEE Electron Device Lett., 16 (1995), pp. 312–315. In this application, the scanning probe is thermally activated and sensed to obtain both a topographic and thermal image of the surface.

Another application relating to SPM uses a probe tip having a nanometer size apex to emit electrons from the apex to the sample surface. The electron emission is used to effect a switching phenomenon in the sample surface at the atomic scale. The switching phenomenon is typically a change of state, change of phase, localized change in resistivity or optical property, or the like.

Yet another SPM application uses the electrical interaction between AFM tip and sample surface to produce a localized enhanced oxidation of the sample (Dagata, Science 270, Dec. 8, 1995). This technique can be used to fabricate electronic devices with dimensions of 10 nm or less.

The foregoing SPM methods mandate a number of requirements that probes must exhibit to successfully implement SPM. The tip assemblies must have the following associated characteristics.

1) The mounting block must be characterized by a geometry which is suited to the particular use of the probe. The mounting block must fit into the SPM, or like instrument, as well as be of sufficient size such that it can be manipulated by the operator of the instrument. This is critical since only the mounting block is large enough to be physically manipulated by the operator of the instrument. Furthermore, the mounting block must be characterized by sufficient rigidity to provide a stable and rigid support for the cantilever. The relationship of the cantilever to the mounting block must be consistent. That is, the cantilever must always be in the same place on the mounting block and extend outwardly for a predetermined distance for each probe made for a specific application. The mounting block must be supported by a larger structure, such as a silicon wafer, from which it is processed in such a way that the mounting block can undergo necessary processing and yet easily be released from the wafer without damage upon completion of processing. Further, the mounting block must be of sufficient dimensions to allow ready attachment to the SPM device by an operator.

2) The cantilever must have suitable dimensions and mechanical properties to control the cantilever spring constant and resonant frequency. Once the desired tip geometry is determined, the dimensions and material from which the cantilever are made determine the resonant frequency, spring constant, and Q value of the cantilever. Detection of the shift in resonant frequency of the cantilever is a powerful method for measuring narrow spacings and thus imaging a sample surface. The most sensitive force microscopes use resonance enhancement of a vibrating cantilever to detect forces as small as $3 \times 10^{-13}$ N. With resonance enhancement, either a shift in the resonant frequency or a decrease in the vibration amplitude can be used for proximity detection. Monitoring the vibration amplitude is equivalent to measuring the Q of the vibrating lever as it interacts with the surface.

The cantilevers in scanning force microscopy applications need a small spring constant to achieve high sensitivity, but also require a high resonant frequency to achieve reasonable scanning speed, and to render the cantilever insensitive to acoustic noise and external vibrations. The limited ability of conventional SPM probes to operate at high scanning speeds is a well known problem (Manalis et al., APL 68, Feb. 5, 1996). In order to achieve low spring constant and high resonant frequency simultaneously, the cantilever must have low mass, as shown by the following relationship of resonant frequency v with spring constant k and cantilever mass m:

$$v \propto \sqrt{\frac{k}{m}}$$

A low mass can be achieved by making the cantilevers physically small. Typical cantilevers are 100–400 microns ($\mu$m) in length, 10–50 $\mu$m in width, and have a thickness in a range of from 0.1–10 $\mu$m. Thus, the size of the cantilever and the tip must be carefully controlled to assure that the cantilever has the correct resonant frequency, spring constant, and Q value for use in a particular SPM method.

The cantilever must further have dimensions appropriate to the measurement being performed. For example, if a laser interferometer is used to measure cantilever displacement, the cantilever must be of sufficient width such that the reflected laser light can be accurately determined.

3) The tip assembly must be suited to the particular use. Image formation at the subnanometer level is not a linear process, and the size and shape of the tip are critical. Accurate measurement of a sample surface is not possible unless the dimensions of the probe are known and are consistent from one tip assembly to the next. If the size and shape of a probe are not accurately known and the size and shape vary from probe to probe, distortions in measurement may be induced. Such distortions must then be removed by complex compensation circuitry or software.

To image high topology surfaces, the tip assembly must comprise a high aspect ratio column depending from the cantilever. The distal end of the column culminates in a tip which is preferably characterized by a high cone angle. The column and tip must be characterized by high torsional rigidity. The column preferably tapers to a minimal diameter tip. This advantageously enables the tip to enter high topology surfaces for accurate imaging. Thus, the tip should be characterized by a high cone angle and a diameter of less than 30 nanometers.

The size of the tip must be similar to or smaller than that of the object to be studied. To achieve atomic resolution, the tip must end with a small cluster of atoms. To scan a micron deep hole, the tip must not exceed the diameter of the hole for a full micron back from the apex. In addition, an extremely narrow tip with a high cone angle may be necessary to measure samples with steep or reentrant topography. This must be achieved without comprising the stiffness or stability of the tip. Reproducibly making such high aspect ratio probes is one of the most difficult tasks in conventional scanning force microscopy.

As shown in FIGS. 1A–C, distortions in measurement are caused by a typical probe-sample interaction. In FIG. 1A, a point 102 of a probe 100 may be too blunt or have a diameter too large to reach the bottom of a trench in an object 106 to be scanned. The true depth of the trench cannot be extracted from the scan 104. (Drawings 1A–C are adapted from Journal of Applied Physics 74(9) Nov. 1, 1993, pp. R83–R109.)

A serious problem in conventional scanning force microscopy arises when a surface to be imaged has regions with steep slopes. On lithographically patterned surfaces, the problem is especially acute. Deep, narrow trenches and holes with undercut sidewalls are common. The ability of a scanning force microscope probe to accurately image surface topography depends strongly on the size and shape of the probe.

FIG. 1B shows the desirability of a high cone angle for a scanning force microscope probe. The angle α is greater than β so that the tip with such a high cone angle α faithfully follows the left side of the trench. Such a probe is limited only in its ability to image the slope of the right side of the trench.

FIG. 1C also shows a probe with a high cone angle as in FIG. 1B but having a tip point with a large radius of curvature. In FIG. 1C, the scan line 104 produced by a blunt probe 102 encountering a sudden step creates a distortion in the image between 1 and 2. The region between 1 and 2 may be referred to as a "dead zone" because it cannot be reached by this probe. As shown in FIG. 1D and in the previous figures, the distortions caused by the size and shape of the tip or point can result in major inaccuracies in the imaging of a surface 112 and are a major problem in conventional scanning force microscopy.

Accordingly, in view of the foregoing requirements, what is needed is the ability to independently control the dimensions of the tip, its supporting column and cantilever.

4) The probe must also have a rigidity that is sufficient to maintain a constant dimensional relationship between the mounting block, cantilever and tip assembly. A lack of stiffness in the probe induces strong distortions in the measurement signal. External vibrations easily superimpose themselves on the cantilever vibrations used in imaging the surface when the tip assembly has insufficient stiffness or rigidity. Also, the probe itself may deform as it is scanned, resulting in noise and false images. A rigid probe and tip assembly are therefore an essential requirement for consistent imaging.

5) The probe must have consistent and reproducible dimensions. In order to provide consistently accurate images of a surface, a probe used for, e.g. AFM, must have the same dimensions as another probe made weeks or months later. The probe must have substantially identical mounting blocks, cantilever structures, resonant frequencies, and tip size and geometry. Few or no imaging instrument adjustments should be necessary to compensate for probe variations in geometry.

Conventional methods of manufacturing a cantilever and associated sensor tip are inadequate to reproducibly form tips capable of operating at the high frequency which may be required for adequate imaging. In order to achieve the objective of atomic resolution, the tip size must be comparable to atomic dimensions. Because the resonant frequency of the cantilever beam also plays a critical role in imaging as previously explained, the probe must not only be reproducible but must be made with constant dimensional parameters in order to control the mechanical resonant properties of the cantilever beam. Presently, tips and cantilever beams produced by typical wet chemical etching techniques are not adequately reproducible. Conventional scanning probe fabrication processes when applied to making a plurality of tips across a single wafer, may result in tips which are of highly nonuniform shape (U.S. Pat. No. 5,201,992, column 5, lines 53–54). Thus, what is needed is a method for batch fabrication of an array of AFM probes which are highly uniform and which are capable of being fabricated with controlled geometry. Also, it is presently not possible to achieve fabrication of an array of SPM tip assemblies with any degree of reproducibility. Thus, probes presently are not interchangeable with a sufficient degree of predictability. The dimensions of the plurality of SPM probes in an array cannot be maintained with uniformity across a single wafer.

6) The method of manufacturing must achieve a high volume production of probes. Due to the tremendous increase in diverse SPM and AFM applications, there is a need for easily reproducible, mass produced probes. During routine use, tips easily can become contaminated or damaged and need to be replaced.

Thus, what is needed is a process for reproducibly fabricating rigid probes of increasing geometric complexity such as tips for biomolecular imaging, CD measurement, or for storage applications. Such a process should be capable of reproducibly fabricating a variety of geometries depending upon the particular application (e.g. for AFM, MFM, STM, or other applications). The tips should be characterized by substantially atomic sharpness which easily can be reproduced and fabricated in large quantities with a high degree of precision.

What is also needed is a process for reproducibly manufacturing a scanning force microscope tip with a high cone angle, a high degree of stiffness, and with predictable reproducibility and high yield. This would be a great advantage over conventional methods of producing scanning force microscope tips. Such a tip assembly would be capable of producing accurate images of surfaces having a slope less than that of the cone angle of the tip.

Conventional scanning probe microscopy tip assemblies have critical problems concerning lack of reproducibility and inability to make rigid tip assemblies to tight manufacturing tolerances. The development and improvement of scanning probe microscopy techniques is strongly dependent upon the development of appropriate probes. Suitable tips must be capable of being fabricated easily and reproducibly in large quantities with substantially atomic sharpness. What is needed is a method for making probes by mass production techniques. What is also needed is a method for making a plurality of probes having consistent or substantially unformed properties from a single wafer. This is necessary because sensor tip damage or contamination for an atomically sharp tip easily occurs in SPM experiments due to the extremely small separation between the sensor and the sample surface.

It is also required that the fabrication process allows for largely independent control over mounting block, cantilever, and tip assembly dimensions such that the probe can be tailored to meet the requirements of specific SPM applications. For example, in one application the AFM is mounted in a scanning electron microscope (SEM) such that the tip and the area being scanned by the tip can be imaged by the SEM while the AFM is in operation. This application requires that the tip assembly have a height greater than one-half the width of the cantilever such that when the probe is mounted above the sample, the distal end of the tip is visible to the scanning electron beam. To facilitate this application it is possible to create a cantilever which has a reduced width, e.g. is triangular in plan view, in the vicinity of the tip assembly.

Up to now, basically several techniques have been used for the production of tips and cantilevers. In one technique, a thin wire or piece of metallic foil is bent and etched electrochemically. As known from the production of STM tips, a radius of curvature of less than 1,000 Å can be prepared by this method. However, tips formed by this method are difficult to prepare and are not easily reproduced at critically small dimensions. This method is also not easily adapted to making large numbers of tips concurrently and to high accuracy. Therefore, this method has been largely abandoned for all but a few applications.

Another method for cantilever preparation involves producing $SiO_2$ cantilevers which are rectangular or triangular in shape by standard etching techniques of an oxidized Si wafer. Standard photo masks are used to define the shape of the cantilevers, so that the geometry is known and spring constants can be calculated. A probing tip is provided by tilting a corner of the cantilever toward the sample. The sharpness of such tips is not well controlled and as a consequence, multi-tip effects can become a severe problem.

Some progress has been made in the use of $Si_3N_4$ instead of $SiO_2$ as a cantilever material. See U.S. Pat. No. 5,066,358 as an example. $Si_3N_4$ cantilevers are less fragile, and the thickness can be reduced from approximately 1.5 to 0.3 $\mu$m. However, such cantilevers have low stiffness and low resonant frequency.

One conventional method of making a tip involves etching a pyramidal pit into a silicon wafer. See U.S. Pat. No. 5,116,462 as an example. Afterwards, a film of $Si_3N_4$ is deposited which follows the contours of the silicon. $Si_3N_4$ is also patterned into the shape of a cantilever. When the silicon is etched away from around the cantilever, the free standing cantilevers have pyramidal $Si_3N_4$ tips which are a replica of the previous pyramidal mold formed in the silicon. Although silicon nitride ($Si_3N_4$) tips may be fabricated with some degree of reproducibility, such cantilevers are limited in their resonant frequency and cannot be used for high frequency applications. Also, $Si_3N_4$ tips have cone angles which are constrained to the angles formed by intersecting <1:1:1> planes. This property makes such tips unsuitable for metrology applications.

What is needed is a new application of silicon based manufacturing techniques to achieve silicon microstructures which are suitable for probes. To date, the manufacture of single crystal silicon tips has been characterized by the use of wet chemical etchants to form the tip and cantilever. Present AFM tips and cantilevers manufactured by isotropic and anisotropic wet chemical etching techniques (such as etching with aqueous potassium hydroxide, KOH) are characterized by inhomogeneity and lack constant reproducibility.

An approach to making a sharp silicon tip is set forth in Marcus et al., U.S. Pat. No. 5,201,992. This patent teaches the use of conventional wet-chemical etching to form a silicon post (protuberance) and oxidation to sharpen the post into a tip. This method has several disadvantages inherent to wet chemical etching techniques. First, in order to prevent the formation of blunt, rounded tips, the etching must be terminated before mask islands become detached from the silicon tapers forming under the mask islands. It is extremely difficult to stop wet-chemical etching by timing the etch rate with any degree of predictability. This process cannot fabricate tips with a high degree of reproducibility. There is little margin for error, and such wet chemical etches are inherently non-reproducible.

After etching the protuberances, U.S. Pat. No. 5,201,992 teaches sharpening the protuberances by oxidation of those structures and removing the surface oxide in concentrated hydrofluoric acid or the like. It is noted at column 5, lines 53–54 of U.S. Pat. No. 5,201,992 that the process is not reproducible for a plurality of structures, and the process results in a plurality of structures that are of highly nonuniform shape. This method has a severe disadvantage in that it is inherently unreproducible. The inability to control the etch rate has the further disadvantage that final geometry of the cantilever and tip cannot be determined with any degree of precision. Further, U.S. Pat. No. 5,201,992 does not teach how a tip could be integrated with a cantilever and mounting block to form a probe suitable for SPM applications.

Bayer et al., U.S. Pat. No. 5,051,379 teach a method for producing a micromechanical sensor for AFM/STM profilometry. The sensor comprises a cantilever beam with a tip at one end and a mounting block at the opposite end. However, the '379 patent fails to disclose or to suggest how a mounting block could be produced using the method described. In a manner similar to the above referenced '992 patent, the method disclosed in the '379 patent preferably utilizes a wet chemical etch, to undercut the mask material and form a silicon tip. This method again has the disadvantage that exquisite control over the etch is required to reproducibly form sharp tips. It is noted at column 6, lines 28–30, that control of the etch timing is critical and in-process monitoring through optical inspection is required. The '379 patent further acknowledges the deficiency of this method at column 4, line 64, where it is noted that ion milling may be required post tip formation to sharpen the tip. Thus, this process in practice lacks sufficient control to reliably form the desired tips.

In a second embodiment, the '379 patent discloses a single crystal structure fabricated by wet chemical etching. The tip is etched on higher order crystal planes using specific conditions for an anisotropic wet chemical etchant. Control of the final tip dimensions, especially tip height, using this technique is extremely difficult, and thus has all of the inherent problems of process control and lack of reproducibility mentioned above.

U.S. Pat. No. 5,282,924 shows an attempt to make a reproducible and uniform cantilever and tip. There, the cantilever beam with an integrated tip is anisotropically etched out of a single-layer silicon wafer. In the '924 method, the single-layer wafer is thinned from the bottom by wet-chemical etching to a thickness which corresponds to about the thickness of the cantilever beam plus twice the height of the tip, plus a residual wafer thickness which is consumed during thermal oxidation.

The '924 process has a similar disadvantage to that of the '379 patent in that the wet chemical etching process is extremely difficult to control. Independent factors such as location and shape of edges, amount and shape of undercut of the silicon surface protected by the mask, differences in etchant concentration, temperature variations and gradients, and degree of agitation make it virtually impossible to control the final geometry of the tip and cantilever, especially the height and thickness respectively, with any degree of reproducibility. This in turn adversely affects the reproducibility of factors critical to the performance of the tip assembly, such as resonant frequency, sensitivity, and suitability for metrology. Thus, the final product lacks the consistency needed to provide accurate and repeatable images.

The '924 patent has a further disadvantage in that the cantilever mask is created prior to the tip mask. The tip lithography is the most demanding because it is the smallest feature of the probe and its placement requires the greatest accuracy. When the cantilever mask is created prior to the tip mask, the tip lithography must be performed on a surface with topography created by the cantilever mask. A planar surface must be provided for the most accurate tip lithography and in '924 this is compromised by the existing cantilever mask.

Lastly, U.S. Pat. No. 5,282,924 fails to suggest how the tip and cantilever fabricated using the process described could be integrated with a mounting block to form a probe suitable for AFM applications. All known anisotropic etchants undercut convex corners in the etching of (100) silicon. The '924 patent fails to disclose how it is possible to achieve uniform rectangular structures without some form of compensation. Uniformity of dimensions could not be achieved using the timed back side etching process of the '924 patent without some form of compensation. The '924 patent further fails to disclose a means for supporting the fragile cantilever and tip structures during processing and handling.

In order to overcome the problems inherent in attempting to control the final geometry, specifically the cantilever thickness and tip height, by timing the etch rate, some conventional methods implant boron into silicon in order to provide an etch stop. When the etching solution encounters a very high concentration of boron in silicon, the etch rate will drop by a factor of approximately 100.

There are significant disadvantages to this method. Initially, it introduces another complex process step of attempting to implant boron at a desired concentration and depth. This is extremely difficult if one attempts to implant boron to the desired depth of the tip height and cantilever thickness, in excess of 4 microns. Typical implantations are limited to approximately 1 micron. Often, epitaxial growth of silicon is employed after the implantation to increase the thickness of the silicon layer, but this process is expensive, time consuming, and the quality of the epitaxial layer is compromised by the high degree of crystal damage in the implanted region. Damage introduced by the implantation can also disadvantageously effect the mechanical properties of the cantilever, including resonant frequency (see Pember et al., APL 66, Jan. 30, 1995, p. 577). Thus, conventional methods of boron implantation severely limit the final geometry and reproducibility of the cantilever and tip.

In an attempt to overcome some of the described problems inherent in controlling the rate and extent of etching solutions, U.S. Pat. No. 5,354,985 discloses a method for forming a cantilever beam and tip for a near field scanning optical microscope (NSOM) utilizing a silicon-on-insulator (SOI) wafer. An NSOM probe is unsuitable for scanning probe microscopy. The cantilever beam of the '985 patent must be sufficiently large to include a wave guide to carry light to the tip. In addition, the tip must be provided with an aperture for emitting photons. '985 is not concerned with supplying a tip of atomic sharpness. The NSOM probe does not require the tightly-controlled dimensions that are so critical to the performance of probes used in scanning probe microscopy.

As a result, the process of making NSOM probes disclosed in '985 differs substantially from a process suitable for making SPM probes. The insulator layer of the SOI wafer used in this process has little influence in determining the final tip and cantilever height.

Another conventional attempt to make accurately-dimensioned SPM probes suitable for AFM was disclosed by J. Itoh, Y. Tohma, S. Kanemaru, and K. Shimizu, *Fabrication of an Ultrasharp and High-aspect-ratio Microprobe with a Silicon-on-iisulator Wafer for Scanning Force Microscopy*, 13 J. VAC. Sci. TECHNOL. 2, 331-34 (Mar./Apr. 1995). This article discloses that a probe comprising a silicon tip and mounting block and a silica cantilever can be made using a SOI wafer. The authors note that a silica cantilever has a low Q value that is insufficient for certain applications, and addition of another material such as silicon after formation of the probe may be necessary to increase the Q value. Also, the tip is sharpened using a KOH etch on higher-order Si planes. Using KOH etch produces unpredictable variations in dimensions, especially in the height of the tip. As a result, the tips formed by this method cannot be made to highly accurate dimensions nor are they easily reproducible.

Thus, none of the foregoing conventional approaches presents a method for producing a probe that has all six required characteristics for SPM as described above. Accordingly, there is a need for a process which can fabricate a SPM probe including a mounting block, cantilever and integrally formed tip assembly with a high degree of reproducibility using batch fabrication techniques that are typically encountered in electronic component fabrication. What is also needed is a process does not rely upon fabrication parameters such as timing the etch rate of wet-chemical, anisotropic or isotropic, etching to form such critical components as the tip and cantilever.

There is also a need for a method for making a probe including a mounting block, cantilever and integrally formed tip in a reproducible manner with a high degree of control over the final geometry of the tip and cantilever in order to optimize the probe performance for specialized applications such as DNA sequencing, CD measurement, high scanning speeds, or measurement of high aspect ratio via holes in integrated circuits. For example, in biomolecular imaging it is desirable to have a much taller cantilever and a longer tip with a high modulus of elasticity. Using the conventional methods described above, it is presently not possible to control the geometry of the tip with a sufficient degree of reproducibility. Thus, the tip assemblies presently marketed for biomolecular imaging, for example, represent a select few from the many tip assemblies which are made but rejected as non-conforming to dimensional specifications. Such tips assemblies are therefore extremely expensive.

It also would be desirable to have independent control over cantilever and tip dimensions such that tall tips could be fabricated on appropriately shaped cantilevers to enable viewing of the tip, in for example a scanning electron microscope, during SPM operation.

It also would be desirable to fabricate a probe including a monolithic mounting block, cantilever and tip assembly with the ability to control the tip geometry to provide a tip that is characterized by substantially atomic sharpness and is ideally of uniform dimensions in order to measure a variety of forces at the atomic level, including ionic repulsion, van der Waals forces, capillary, electrostatic, magnetic, and frictional forces.

It also would be desirable to be able to fabricate with batch techniques and high reproducibility, a probe wherein the tip geometry is controllable to provide a small radius of curvature and a small cone angle (high aspect ratio) for achieving substantially atomic resolution.

It also would be desirable to fabricate a monolithic probe including a tip with well controlled geometry and substantially atomic sharpness which can be used to emit electrons to effect a change in static or change in material properties on a neon atomic scale.

SUMMARY OF THE INVENTION

In order to achieve the foregoing objectives and to overcome the problems inherent in conventional methods for producing a probe for SPM, AFM, MFM, or like applications, a first aspect of the present invention uses dry etching or reactive ion etching (RIE) to fabricate a tip assembly which is highly reproducible and is characterized by a high aspect ratio and a tip having a high cone angle and substantially atomic sharpness. The dry etch advantageously eliminates chemical etching solutions, process variability, and lack of ability to provide close control over the final geometry of a cantilever beam and tip integrated into the cantilever beam. This aspect of the invention advantageously enables the final geometry of a probe to be optimized for a specific imaging application such as extended high frequency operation. This also makes possible the fabrication of cantilevers with predetermined dimensions and resonant frequency characteristics for specialized applications such as biomolecular imaging and DNA sequencing, as well as critical dimension (CD) measurements.

In another aspect of the invention, a silicon on insulator (SOI) wafer is preferably used for the starting or base material for making the tip assemblies.

However, in contrast to conventional methods using SOI wafers, one silicon layer (the "upper layer" or "front side") of the SOI wafer is chosen to be a thickness equaling approximately the sum of the cantilever thickness and height of the tip above the cantilever (in one application, approximately 12 $\mu$m) and the insulating layer between the upper and lower silicon layers is used as an etch stop. This aspect of the invention advantageously eliminates the difficulty inherent in controlling process parameters during the long times required to etch thicker silicon layers. This aspect of the invention also has the advantage of forming the tip and cantilever to a uniform dimension and high aspect ratio.

Another aspect of using reactive ion etching for forming the cantilever and tip in a single operation is that it provides the advantage of forming a tip with an extremely high aspect ratio and uniform dimensions for optimal imaging at the atomic scale in AFM and like applications.

In accordance with another aspect of the invention, it is now possible to control the fabrication parameters for the cantilever and tip assembly to such an extent as to build with batch techniques and high reproducibility, a plurality of probes from a single wafer having uniform dimensions and predetermined mechanical resonance properties. This has the advantage of enabling SPM probes to be provided with properties selected to optimize probe performance for a specific application.

BRIEF DESCRIPTION OF THE DRAWINGS

FIG. 22 is a plan view of another front side mask according to the invention.

FIG. 23 is a perspective view of another probe produced according to the invention.

FIG. 24 is a schematic side view of another probe produced according to the invention.

DESCRIPTION OF THE PREFERRED EMBODIMENTS

Figure 1A:
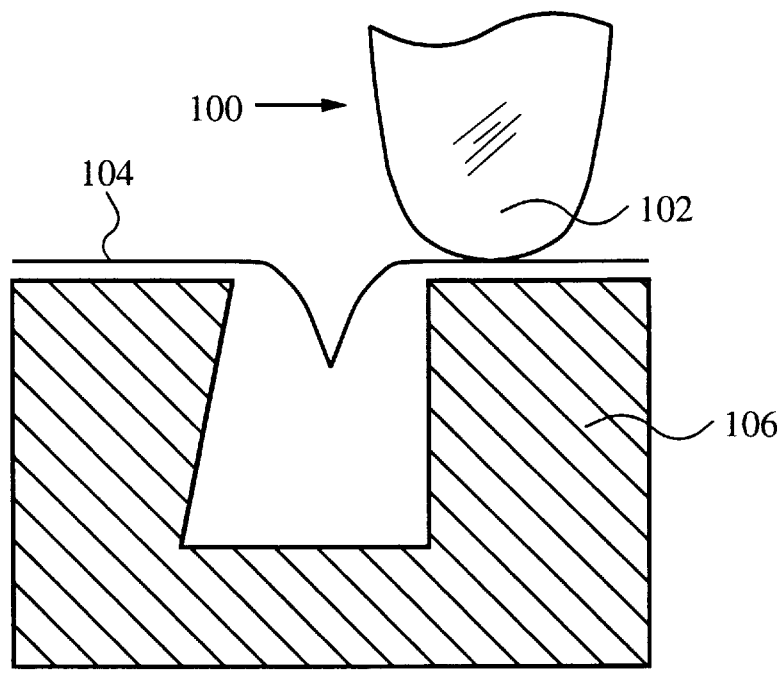
FIGS. 1A–1D illustrate the general principle of scanning probe microscopy and show the profiles traced by probes of different tip shapes.
Figure 1B:
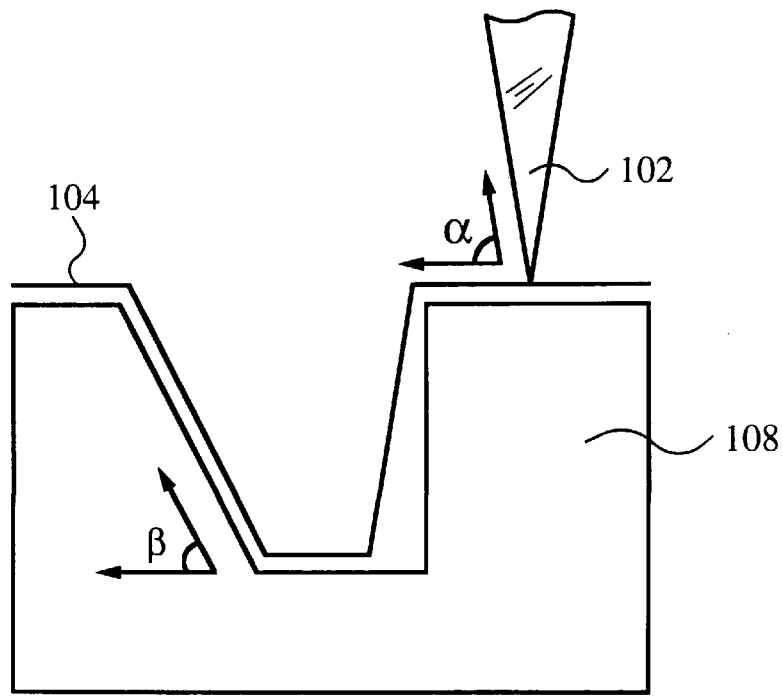
Figure 1C:
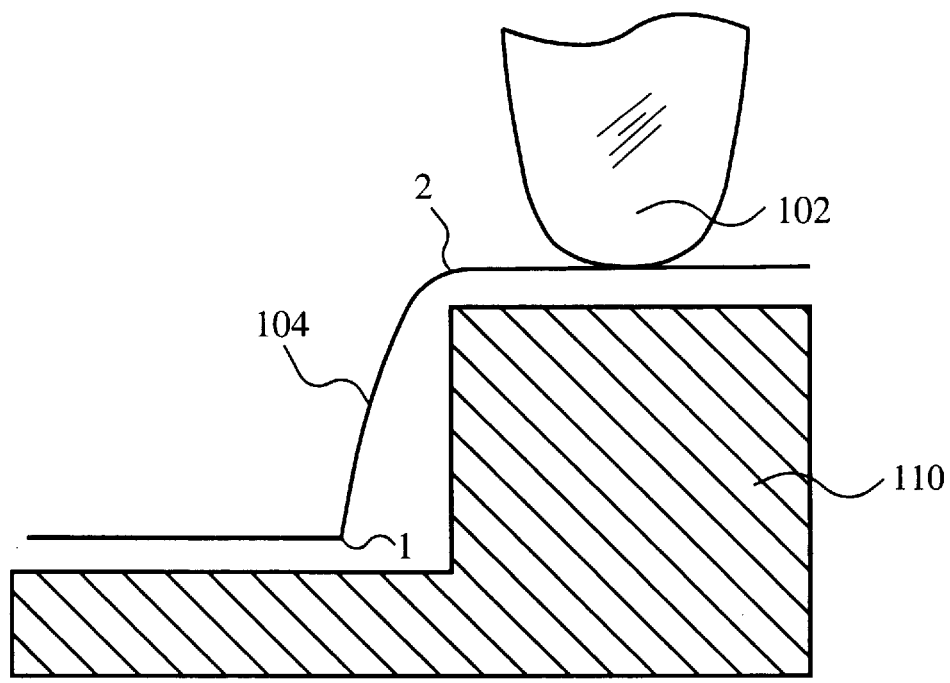
Figure 1D:
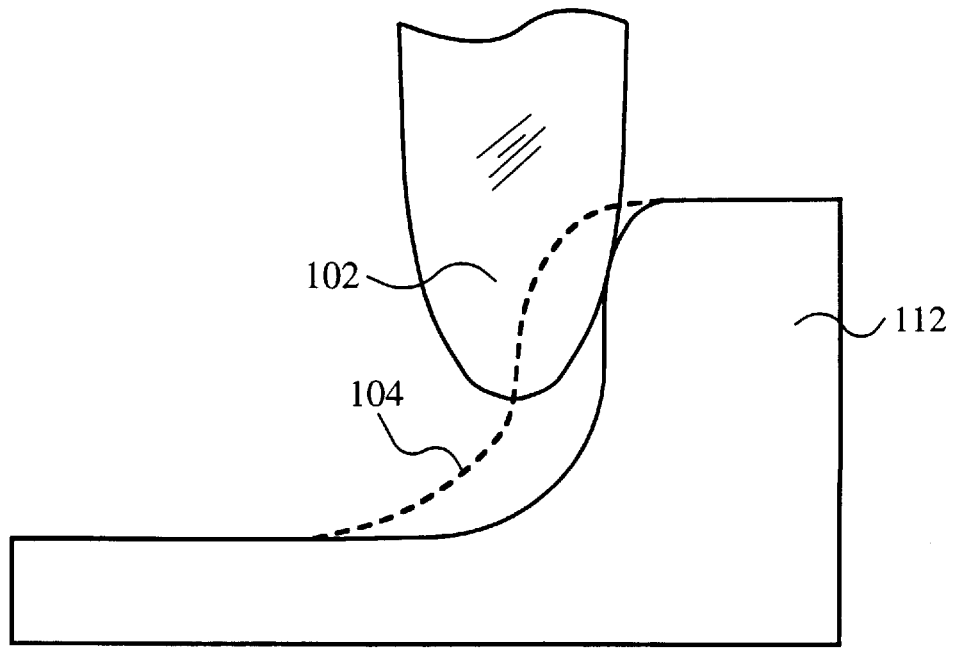
Figure 2A:
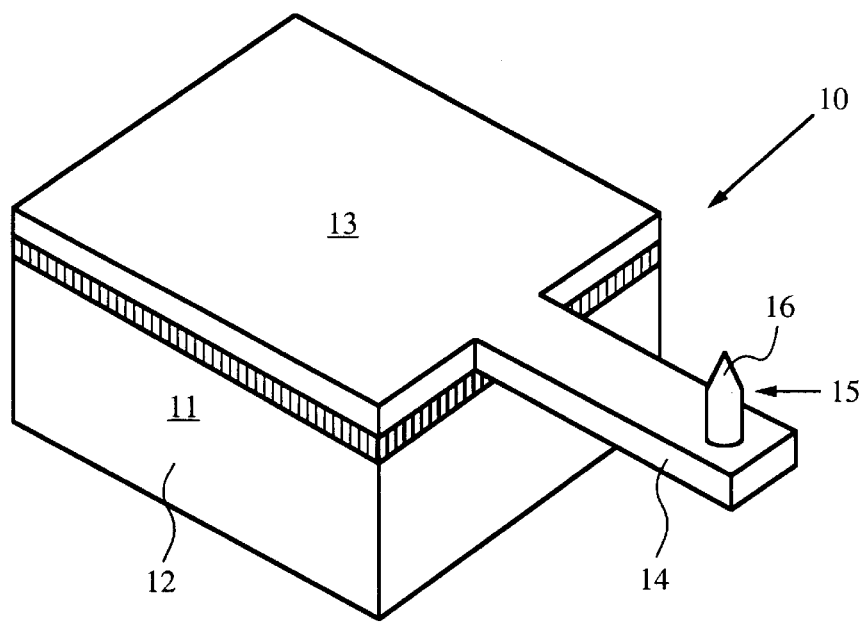
FIG. 2A is a perspective view of a probe produced according to the invention.

An aspect of the invention provides new probes that can be used in scanning probe microscopy. The probes have highly accurate dimensions and provide unprecedented consistency in their imaging performance. The preferred embodiment of the invention is illustrated in FIGS. 2–14. Referring to FIG. 2A, a probe 10 includes a mounting block 12 for mounting probe 10 in a scanning probe microscope, or similar instrument. Mounting block 12 includes a bottom section 11 and a top section 13. A cantilever 14 extends from top section 13 and terminates in a free end. Cantilever 14 has an integral tip assembly 15 culminating in a tip 16. The tip has a cone angle of preferably less than 30° and ends in a point having a diameter preferably less than 30 nm. The specific dimensions of cantilever 14 and tip 16 are independently controlled in the production of probe 10, as will be described in detail below. The preferred embodiment describes a method for producing cantilever 14 with a thickness of 4 $\mu$m. These dimensions are for illustrative purposes only. The dimensions of cantilever 14 and tip 16 may be varied to tailor probe 10 to a specific SPM application. In one application, the mounting block has dimensions (height×width×length) of 0.4×1.6×3.4 mm.

Figure 2B:
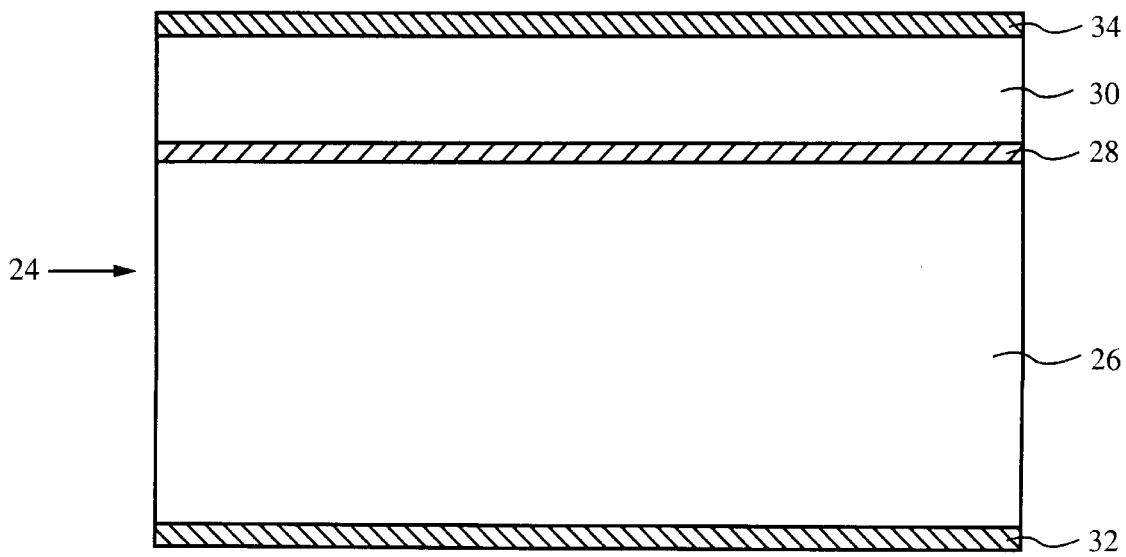
FIG. 2B is a side view of a SOI wafer bilaterally coated with a masking material.

Referring to FIG. 2B, probe 10 is preferably produced from a silicon-on-insulator insulator (SOI) wafer 24. SOI wafer 24 has a bottom layer 26 of single crystal silicon, a middle layer 28 of insulating material, and a top layer 30 of single crystal silicon. In the preferred embodiment, wafer 24 is an n-type <100>-oriented SOI substrate. In alternative embodiments, wafer 24 may have different orientations. Also in the preferred embodiment, middle layer 28 is a layer of silicon dioxide. Wafer 24 may be formed by oxidizing two silicon wafers and bonding them together. Alternatively, wafer 24 may be formed by implanting oxygen in a silicon wafer to form a buried oxide layer, in which case the thickness of layer 30 may be increased by silicon epitaxy. Specific techniques of providing a SOI wafer are well known in the art. The specific thickness of bottom layer 26, middle layer 28, and top layer 30 are selected based on the desired dimensions of probe 10. In general, bottom layer 26 has a preferred thickness in a range of 300 to 500 μm, and top layer 30 has a preferred thickness in a range of 12 to 15 μm. In particular, top layer 30 is selected to have a thickness that is 1 to 2 μm greater than the sum of the desired thickness of cantilever 14 and the desired height of tip assembly 15. The thickness of top layer 30 is selected in this manner to provide precise control of the dimensions of cantilever 14 and tip assembly 15, as will be explained in detail below. In the example of the preferred embodiment, the desired thickness of cantilever 14 is 4 μm and the desired height of tip assembly 15 is 6 μm so that top layer 30 is selected to have a thickness of 12 μm.

Referring still to FIG. 2B, wafer 24 is bilaterally coated to form a first layer 34 of masking material on top layer 30 and a second layer 32 of masking material on bottom layer 26. In the preferred embodiment, layers 32 and 34 include an outer layer of silicon nitride stacked on an inner layer of silicon dioxide. The outer layer of silicon nitride is preferably 0.3 μm thick, while the inner layer of silicon dioxide is preferably 1.5 μm thick.

In one embodiment, the layers of silicon dioxide and silicon nitride are deposited on wafer 24 by chemical vapor deposition (CVD). In alternative embodiments, the layer of silicon dioxide is thermally grown on wafer 24 before the layer of silicon nitride is deposited with CVD. Specific techniques of coating a wafer with a layer of silicon nitride stacked on a layer of silicon dioxide are well known in the art. In an alternative embodiment, first layer 34 and second layer 32 are each single layers of silicon dioxide. However, silicon nitride is more resistant to KOH etching than silicon dioxide, so that it is preferable to include the first and second layers of silicon nitride in the masking material.

Figure 3:
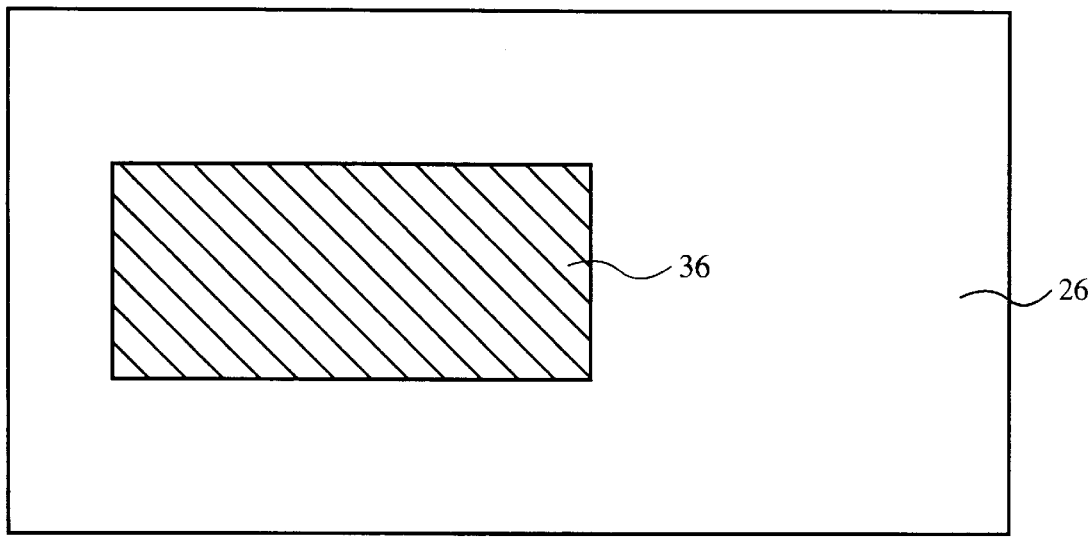
FIG. 3 is a plan view of a back side mask according to the invention.
Figure 4:
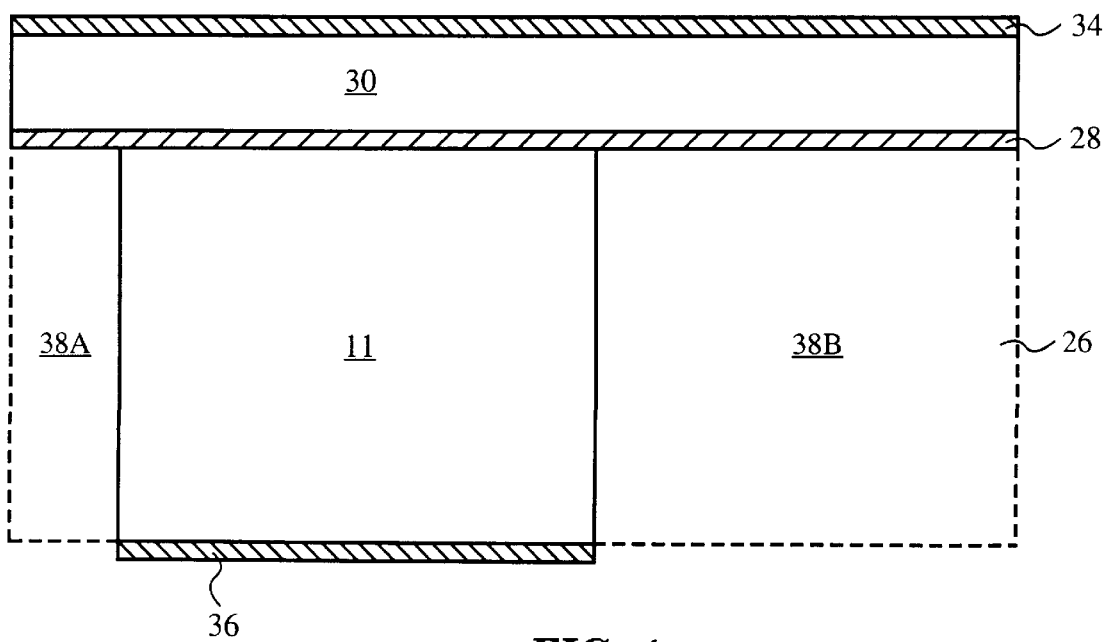
FIG. 4 is a schematic side view of the SOI wafer of FIG. 2B after bottom layer etching.

Referring to FIG. 3, second layer 32 is patterned and etched to form a back side mask 36 on bottom layer 26. Back side mask 36 defines a bottom mounting block pattern for forming bottom section 11 of mounting block 12. Back side mask 36 is formed using conventional lithographic techniques well known in the art. These techniques comprise applying photoresist to layer 32 in a desired pattern of back side mask 36 and reactive ion etching layer 32 to transfer the desired pattern into layer 32. After producing back side mask 36, bottom layer 26 is etched to form a bottom section 11 of mounting block 12, as shown in FIG. 4. Bottom layer 26 is preferably etched with 25 wt. percent aqueous KOH solution at 80° C.

The etching of bottom layer 26 removes sections 38A and 38B of bottom layer 26 to form bottom section 11 of mounting block 12. Further, the etching of bottom layer 26 automatically terminates at middle layer 28. This is due to the extremely slow etching rate of silicon dioxide relative to silicon in KOH. This aspect of the invention provides a significant advantage in controlling the dimensions of both mounting block 12 and cantilever 14. The rate and duration of a wet chemical etch are two of the least controllable fabrication parameters in conventional methods of producing a microprobe. Middle layer 28 eliminates the need to rely on these parameters in controlling the height of mounting block 12 and the thickness of cantilever 14.

Figure 5:
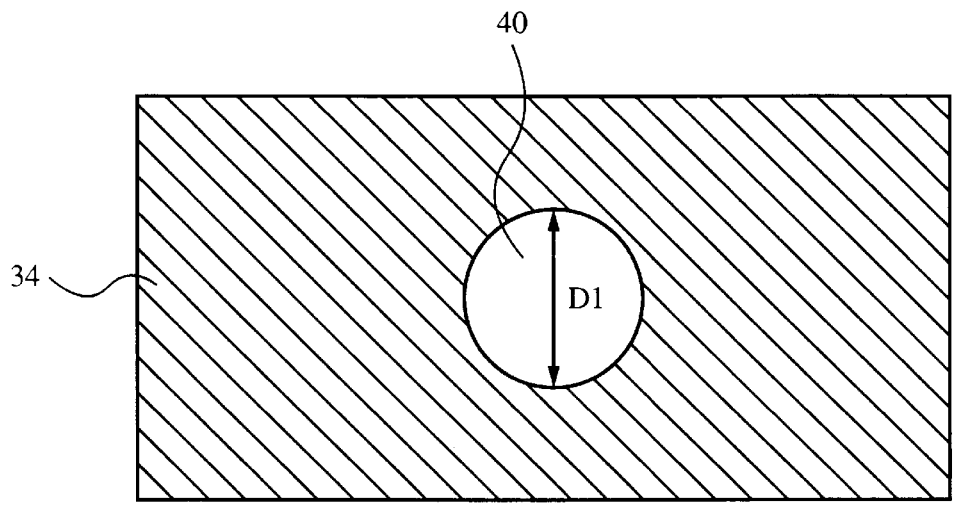
FIG. 5 is a plan view of tip mask pattern.

Following the etching of bottom layer 26, layer 32 is stripped of its outer layer of silicon nitride using, preferably, reactive ion etching. In another embodiment, the exposed portions of middle layer 28 may also be stripped. Referring to FIG. 5, a tip mask pattern 40 is applied to first layer 34 using conventional lithographic techniques. Such techniques, which are well known in the art, involve applying resist material to the surface, exposing the pattern, and developing the resist to leave desired pattern 40 in resist material on first layer 34. At this point in the method, the surface of first layer 34 is completely planar. Performing tip lithography on the planar surface enables tip 16 to be defined under optimal conditions. In the preferred embodiment, tip mask pattern 40 is aligned with bottom section 11 by using etch holes patterned in the top layer (not shown). In an alternative embodiment, tip mask pattern 40 is aligned with bottom section 11 by using a lithography machine fitted with back side or double side alignment capability. Specific techniques of front to back side alignment are well known in the art. Tip mask pattern 40 has a diameter D1 which corresponds to a desired diameter of the base of tip 16. In the example of the preferred embodiment diameter D1 is 1.5 μm.

Figure 6:
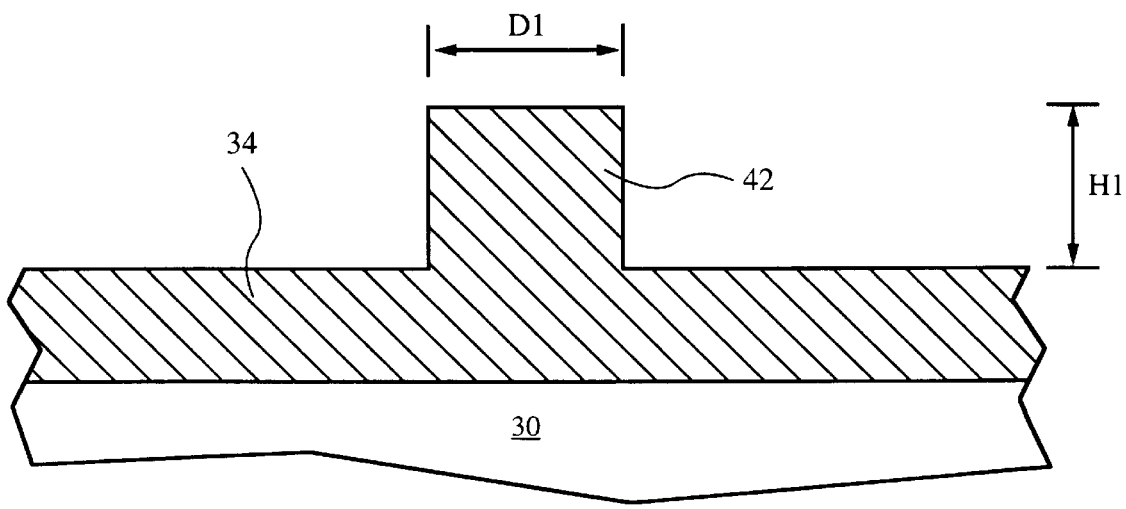
FIG. 6 is a schematic cross sectional view of a tip mask.

Once tip mask pattern 40 has been applied to first layer 34, first layer 34 is partially etched to form a tip mask 42, as shown in FIG. 6. In the preferred embodiment, first layer 34 is partially etched by reactive ion etching in a parallel plate configuration with $CHF_3$ and $O_2$ as etch gases at a pressure in the range of 10 to 20 mT and a RF power in the range of 125 to 150W. The $CHF_3$ is applied at a flow rate of 48 standard cubic centimeters per minute (sccm) and the $O_2$ is applied at a flow rate of 2 sccm. Tip mask 42 is a cylindrical post having a height H1. Height H1 is selected in dependence on the desired dimensions of tip assembly 15. In the example of the preferred embodiment, height H1 is 1.25 μm.

Figure 7:
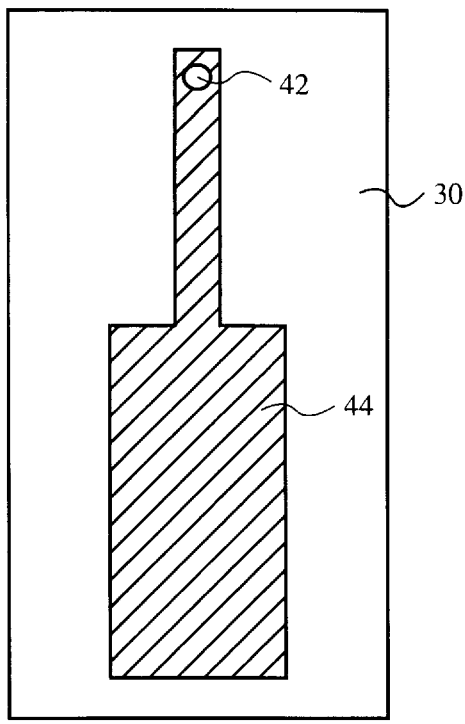
FIG. 7 is a plan view of a front side mask.
Figure 8:
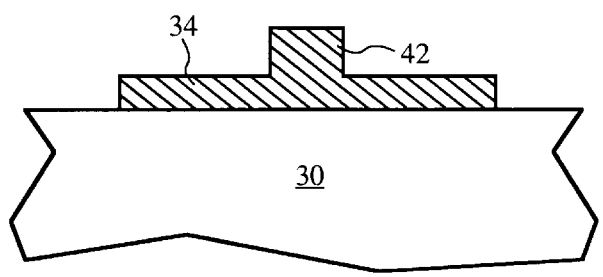
FIG. 8 is a schematic cross sectional view of the front side mask of FIG. 7.
Figure 9:
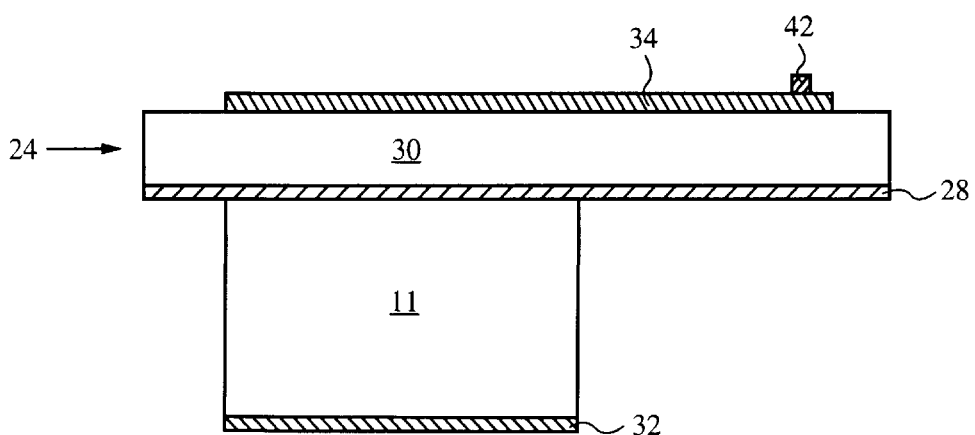
FIG. 9 is a schematic side view of the front side mask of FIG. 7.

Referring to FIG. 7, a front side mask 44 is then produced in first layer 34. Front side mask 44 defines a cantilever pattern and a top mounting block pattern. Front side mask 44 is patterned using a conventional lithographic techniques. Next, first layer 34 is etched to form front side mask 44. In the preferred embodiment, this is done by reactive ion etching first layer 34 with $CHF_3$ and $O_2$ as etch gases at a pressure in the range of 10 to 20 mT and a RF power in the range of 125 to 150W. The $CHF_3$ is applied at a flow rate of 48 sccm and the $O_2$ is applied at a flow rate of 2 sccm. The resulting structure of first layer 34 is shown in FIG. 8 and FIG. 9. FIG. 8 is a cross sectional view of first layer 34, tip mask 42, and a portion of top layer 30. FIG. 9 shows a side view of the resulting structure of wafer 24 after the step of producing front side mask 44.

Figure 10:
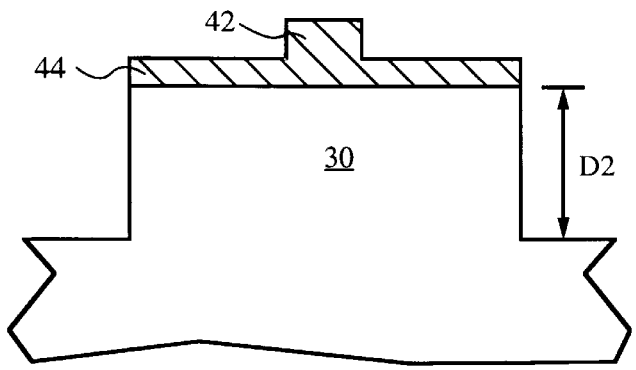
FIG 10 is a schematic cross sectional view of a portion of the SOI wafer of FIG. 2 after transferring the front side mask pattern of FIG. 7.
Figure 11:
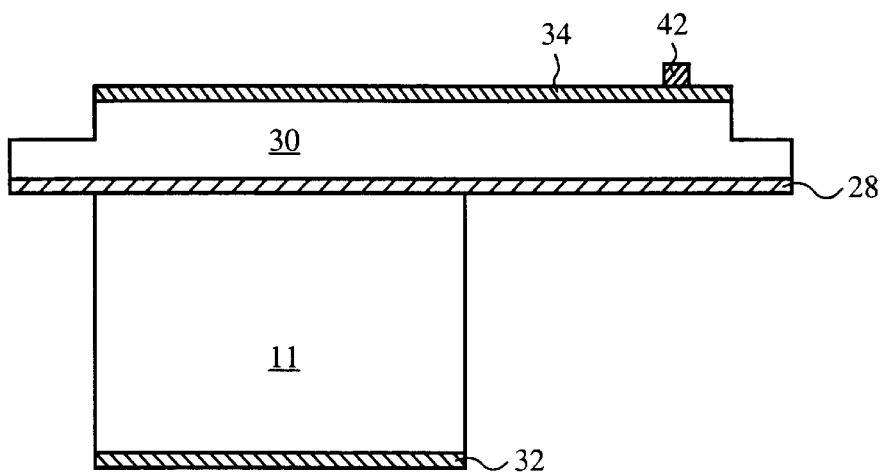
FIG. 11 is a schematic side view of the SOI wafer of FIG. 2 after transferring the front side mask pattern of FIG. 7.

The cantilever pattern and top mounting block pattern defined by front side mask 44 are transferred into layer 30, as shown in FIG. 10. The patterns are transferred by etching top layer 30 to a depth D2 corresponding to the desired cantilever thickness. In the example of the preferred embodiment, depth D2 is 4 μm, corresponding to the desired cantilever thickness of 4 μm. The transferring step is preferably accomplished by reactive ion etching top layer 30 with $Cl_2$ and $BCl_3$ as etch gases at a pressure in the range of 30 to 40 mT and a bias voltage of 350V. The $Cl_2$ is applied at a flow rate of 48 sccm and the $BCl_3$ is applied at a flow rate of 2 sccm. Of course, a higher concentration of $BCl_3$ or an equivalent etchant could also be used. Transferring of the cantilever pattern into top silicon layer 30 by using an RIE etch provides the advantage of allowing the thickness of cantilever 14 to be well controlled. Additionally, the cantilever 14 geometry is determined independently of any other structures, such as the tip and mounting block. FIG. 11 shows a side view of the resulting wafer 24 after the transferring step.

Figure 12:
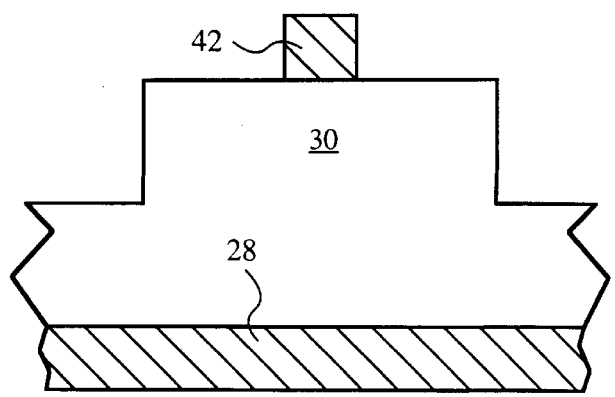
FIG. 12 is a schematic cross sectional view of a portion of the SOI wafer of FIG. 2 after removing the front side mask of FIG. 7.

Next, front side mask 44 is removed. In the preferred embodiment, front side mask 44 is removed by reactive ion etching first layer 34 with $CHF_3$ and $O_2$ as etch gases at a pressure in the range of 10 to 20 mT and a RF power in the range of 125 to 150W. The $CHF_3$ is applied at a flow rate of 48 sccm and the $O_2$ is applied at a flow rate of 2 sccm. The removal of front side mask 44 leaves only tip mask 42 remaining on top layer 30, as shown in FIG. 12.

Figure 13:
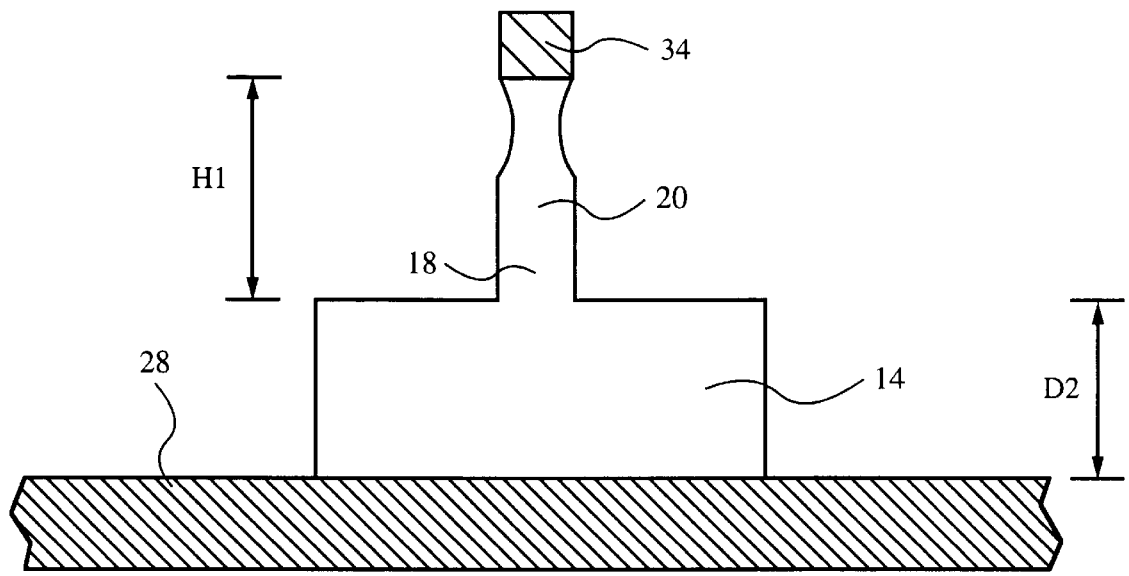
FIG. 13 is a schematic cross sectional view of a cantilever and tip column according to the invention.

Top layer 30 is further etched to form a tip column 20, as shown in FIG. 13. The further etching of top layer 30 also etches layer 30 to middle layer 28, thus forming cantilever 14 and top section 13 of mounting block 12. In the preferred embodiment, this etch is performed by reactive ion etching with $Cl_2$ and $BCl_3$ as etch gases at a pressure 60 mT and a bias voltage of 300 V. That etch is immediately followed by a second reactive ion etch with $Cl_2$ and $BCl_3$ as etch gases at a pressure of 30 mT and a bias voltage of 350 V. The $Cl_2$ is applied at a flow rate of 48 sccm and the $BCl_3$ is applied at a flow rate of 2 sccm. In an alternative embodiment, the etch is performed with a series of three reactive ion etches. The first etch in the series uses $Cl_2$ and $BCl_3$ as etch gases at a pressure of 30 mT. The second etch in the series uses $SF_6$ and $O_2$ as etch gases at a pressure of 100 mT. The third etch in the series uses $Cl_2$ and $BCl_3$ as etch gases at a pressure of 30 mT. During the formation of tip column 20, it is advantageous to introduce a slightly isotropic etchant to encourage tip formation. Such etchants are $Cl_2$, and $BCl_3$ at high pressures, or $SF_6$.

The etching of top layer 30 to form cantilever 14 automatically terminates at layer 28, which provides an etch stop. This is a very advantageous aspect of the invention, because it allows the thickness of cantilever 14 to be precisely controlled in a highly reproducible manner. In another embodiment, if exposed middle layer 28 has already been removed, the etch is terminated when the silicon floor is consumed. This endpoint is easily determined by visual inspection. As shown in FIG. 13, cantilever 14 is formed with a thickness equal to depth D2, which was previously defined in the step of transferring the cantilever pattern into top layer 30.

Tip column 20 has a height H1 equal to the selected thickness of top layer 30, less the selected thickness of cantilever 14. In the example of the preferred embodiment, top layer 30 was selected to be 12 μm thick and cantilever 14 was selected to be 4 μm thick, so that height H1 is 8 μm. This demonstrates another extremely advantageous aspect of the invention. By selecting the thickness of top layer 30, one can precisely control the thickness of cantilever 14 and height H1 of tip column 20 with a high degree of accuracy, yet still independently define both dimensions.

Figure 14:
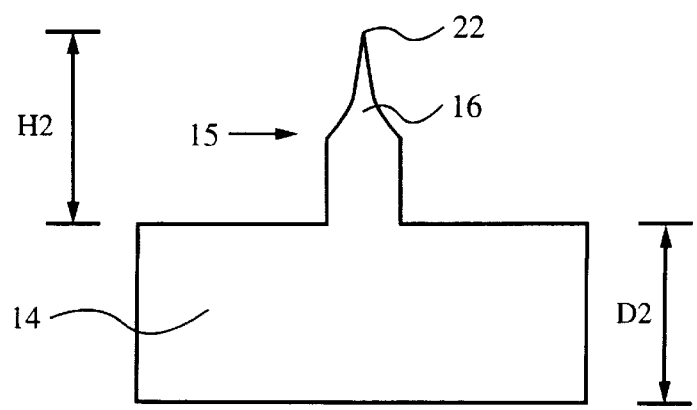
FIG. 14 is a schematic cross sectional view of the cantilever of FIG. 13 with an integral tip according to the invention.

Referring to FIG. 14, tip column 20 is oxidized to form tip assembly 15 having a height H2. In the example of the preferred embodiment, height H2 is 6 μm. As stated previously, height H2 may be easily and precisely controlled by selecting the thickness of top layer 30 to be the sum of the desired tip height and cantilever thickness plus 1 to 2 μm. The additional thickness is consumed or pinched off during the oxidation process in a well controlled manner. In the preferred embodiment, the oxidation of tip column 20 is performed at 1000° C. using $H^2$ at a flow rate of 4.5 l/m and $O^2$ at a flow rate of 2.51 l/m. In an alternative embodiment, the oxidation is performed at 1000° C. using $H^2$ at a flow rate of 2.25 l/m and $O^2$ at a flow rate of 1.25 l/m. Specific techniques of oxidizing tip 16 are well known in the art. The oxidation step produces an oxide layer (not shown) on tip 16 and other exposed silicon surfaces. The oxide layer is removed in hydrofluoric acid in a manner well known in the art. The hydrofluoric acid also etches the remaining portions of middle layer 28. Thus, the exposed portion of middle layer 28 shown in FIG. 13 is removed in the hydrofluoric acid, resulting in the finished probe 10 shown in FIG. 2A.

Figure 15:
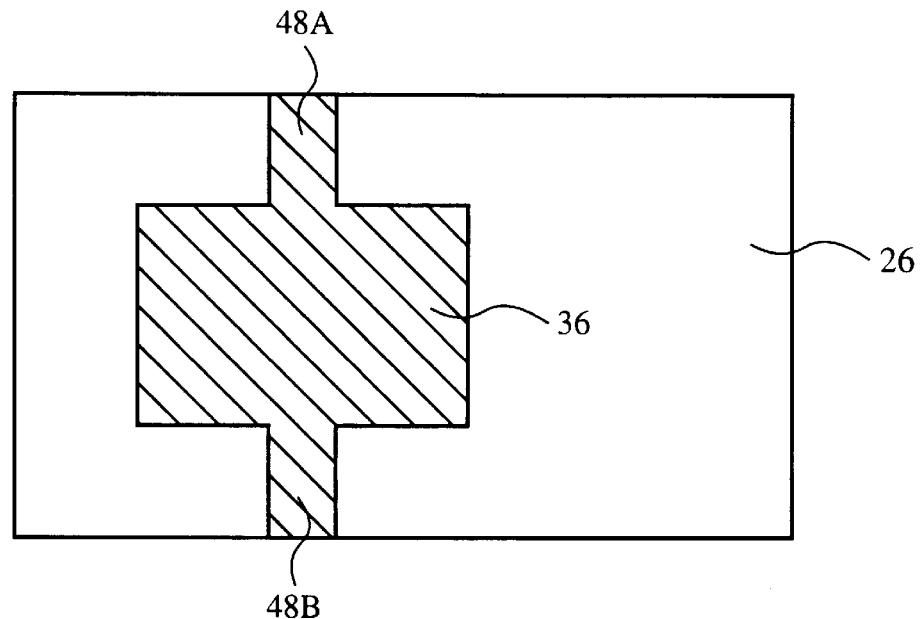
FIG. 15 is a top plan view of two process tab masks according to the invention.
Figure 16:
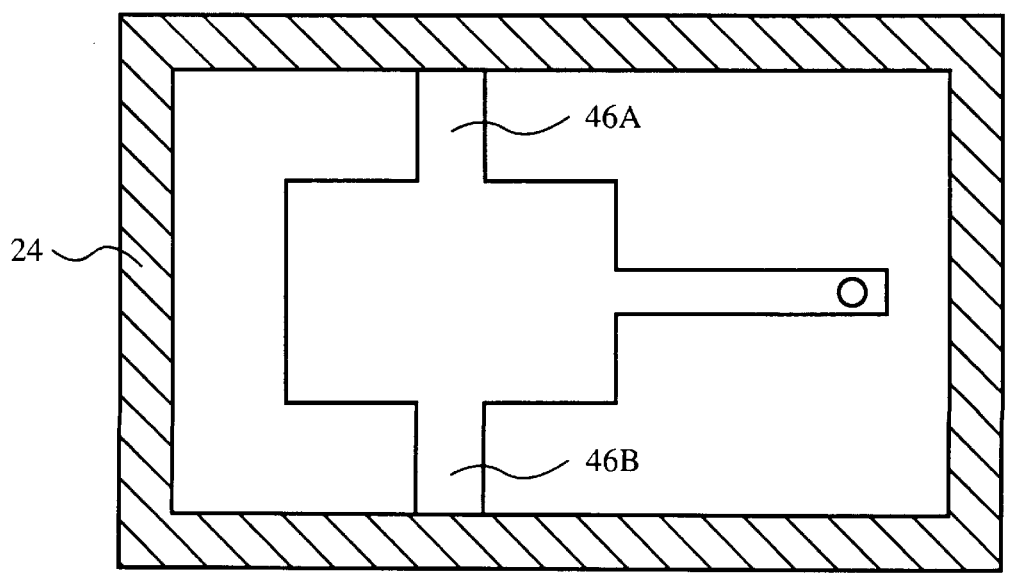
FIG. 16 is a schematic top view of another probe held to another SOI wafer by two process tabs.
Figure 17:
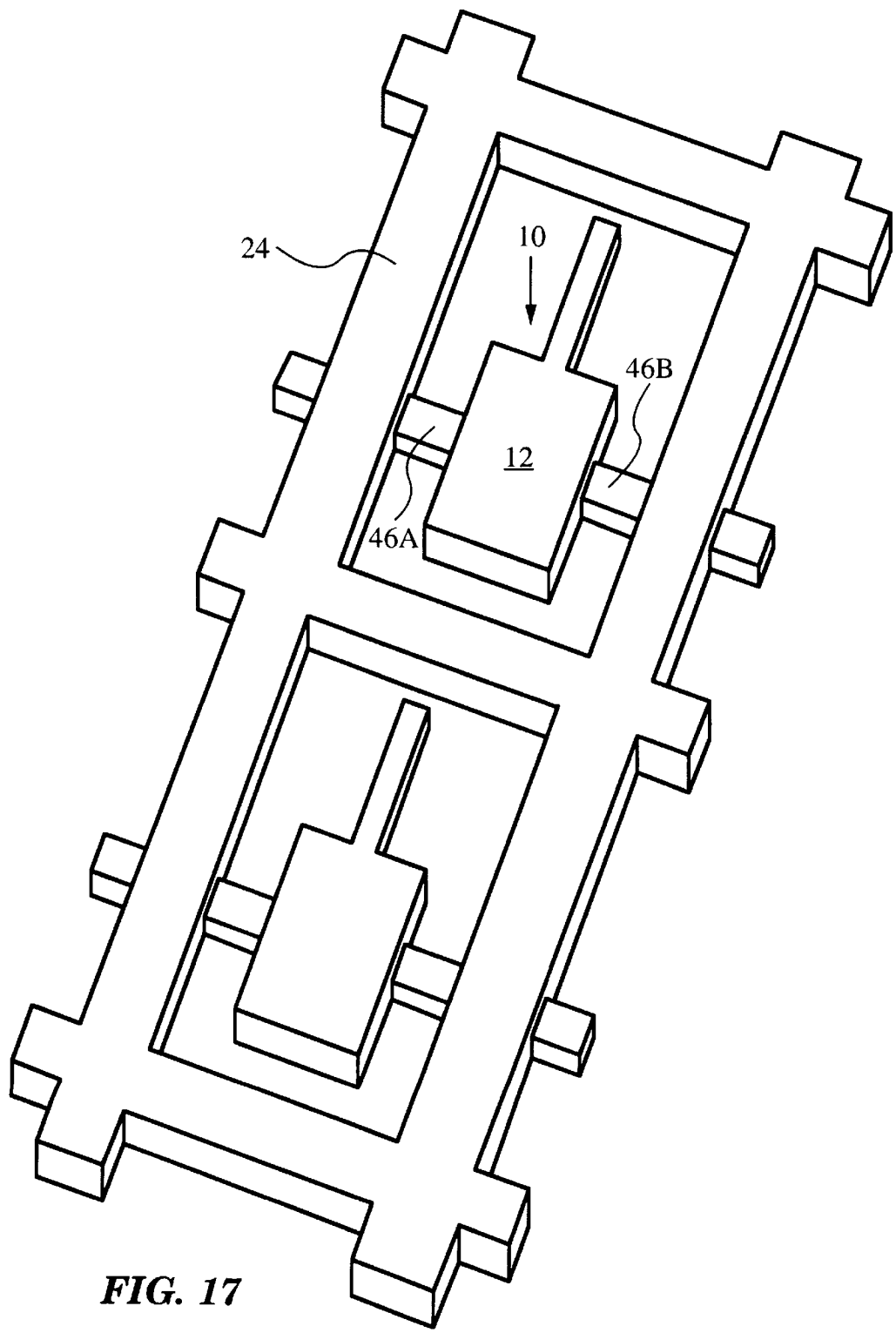
FIG. 17 is a perspective view of the probe and SOI wafer of FIG. 16.

A second embodiment of the invention is illustrated in FIGS. 15–17. The second embodiment of the invention presents a method for holding probe 10 in wafer 24 during production of probe 10. Referring to FIG. 15, back side mask 36 is modified to include process tab masks 48A and 48B prior to the step of etching bottom layer 26. Process tab masks 48A and 48B and back side mask 36 are patterned using a conventional lithographic step of applying photoresist to second layer 32 in a desired pattern for back side mask 36 and process tabs masks 48A and 48B. Next, the desired pattern of process tabs masks 48A and 48B is transferred into second layer 32 in the same etching step used to form back side mask 36.

Bottom layer 30 is etched in same manner described in the preferred embodiment to form two process tabs 46A and 46B extending from bottom section 11 of mounting block 12, as shown in FIG. 16. Process tabs 46A and 46B are for holding probe 10 in wafer 24 during the production of probe 10. To remove probe 10 from wafer 24, process tabs 46A and 46B are mechanically broken by any convenient method. Process tabs 46A and 46B serve a usefutl purpose for fabricating an array of probes 10 from one wafer 24. A perspective view of two probes 10 held in wafer 24 is shown in FIG. 17. For simplicity, only two probes 10 are shown in FIG. 17. It is obvious that a much larger number of probes 10 can be produced in wafer 24.

Each individual probe is removed from the wafer by breaking the edge tabs that hold each probe in the wafer during processing. The process tabs form a useful manufacturing function for fabricating an array of cantilevers/tips with uniform dimensions and high reproducibility across a wafer. Using the process in accordance with an aspect of the present invention, on a 4" wafer, one advantageously would obtain approximately 200–300 probes with uniform dimensions and substantially atomically sharp tips on cantilevers and associated mounting blocks. The process tabs are important in that they enable the mounting block, cantilever and integrally formed tip to be suspended over the empty area formed by removal of the silicon wafers of the SOI wafer 24. The process tabs are fabricated at the thickness of the SOI wafer. They are sufficiently narrow such that the probe can be removed mechanically without danger of damage. The process tabs also provide an important function in that they are rigid enough to provide mechanical support during all of the processing steps for the tip assembly.

Figure 18:
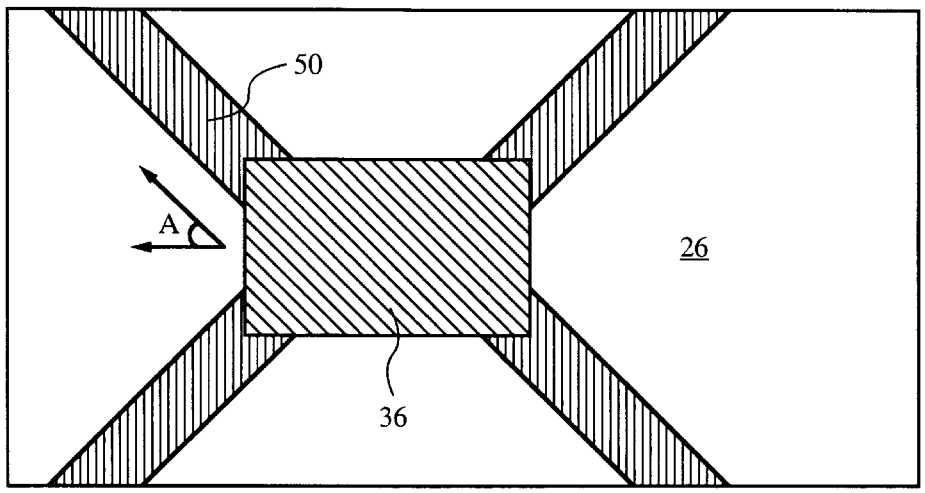
FIG. 18 is a plan view of another back side mask and four edge compensation structures according to the invention.
Figure 19:
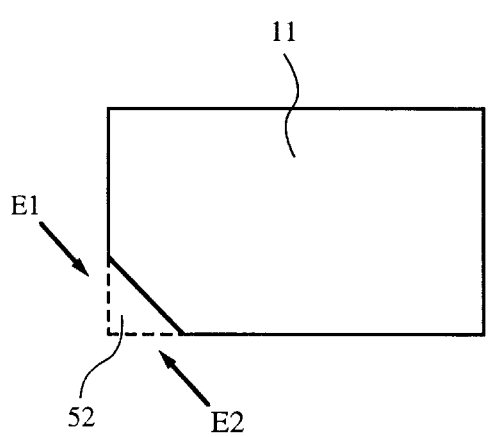
FIG. 19 is a schematic view of a mounting block with a cut corner.
Figure 20:
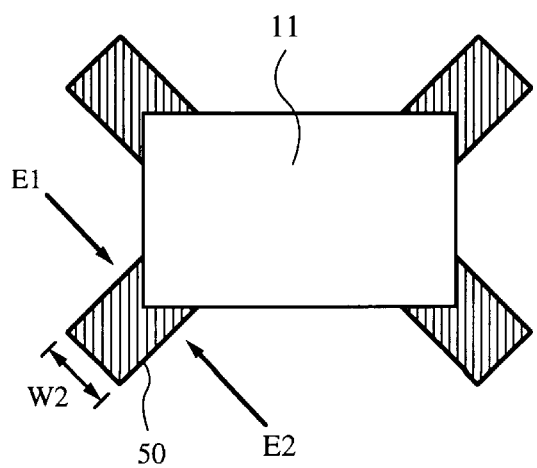
FIG. 20 is a schematic view of one edge compensation structure of FIG. 18.

A third embodiment of the invention is illustrated in FIGS. 18–20. FIG. 18 shows back side mask 36 on bottom layer 26 as in the preferred embodiment described above.

This embodiment adds the step of producing mask patterns for edge compensation structures 50 prior to etching bottom layer 26. Edge compensation structures 50 are for preserving the corners of bottom section 11 during the step of etching bottom layer 26 with KOH. Mask patterns for edge compensation structures 50 are produced by conventional lithography of second layer 32 to form a desired pattern for edge compensation structures 50. The desired pattern for edge compensation structures 50 and back side mask 36 are then transferred into second layer 32 using a reactive ion etch. Edge compensation structures 50 are produced at an angle A relative to the latitudinal axis of back side mask 36. In the preferred embodiment, angle A is 45°.

As described in the preferred embodiment above, the etching of bottom layer 26 is performed with an aqueous solution of KOH. Anisotropic KOH etches the higher order planes exposed at convex corners of bottom section 11 faster than it etches the low order planes on the sides of bottom section 11. As a result, the corners of bottom section 11 may be undercut or faceted. Referring to FIG. 19, the anisotropic KOH etch has a first etch direction E1 and a second etch direction E2. A possible result of the anisotropic etch is an undercut corner 52 of bottom section 11. Note that faceting does not occur at concave corners.

The solution to this problem is shown in FIG. 20. During the KOH etching of bottom layer 26, edge compensation structures 50 preserve the corners of bottom section 11 by blocking etch direction E1 and etch direction E2. Each edge compensation structure 50 is selected to have a width W2. As the KOH etchant etches the silicon of bottom layer 26, it also etches through width W2 of each compensation structure 50, thus dissolving edge compensation structures 50. Width W2 is selected such that at the moment bottom layer 26 is etched to a desired depth, each edge compensation structure 50 is dissolved. In the preferred embodiment, width W2 is 410 $\mu$m for a wafer thickness of 450 $\mu$m. The use of edge compensation structures 50 advantageously allows the dimensions of bottom section 11 to be controlled with greater uniformity and reproducibility.

Figure 21:
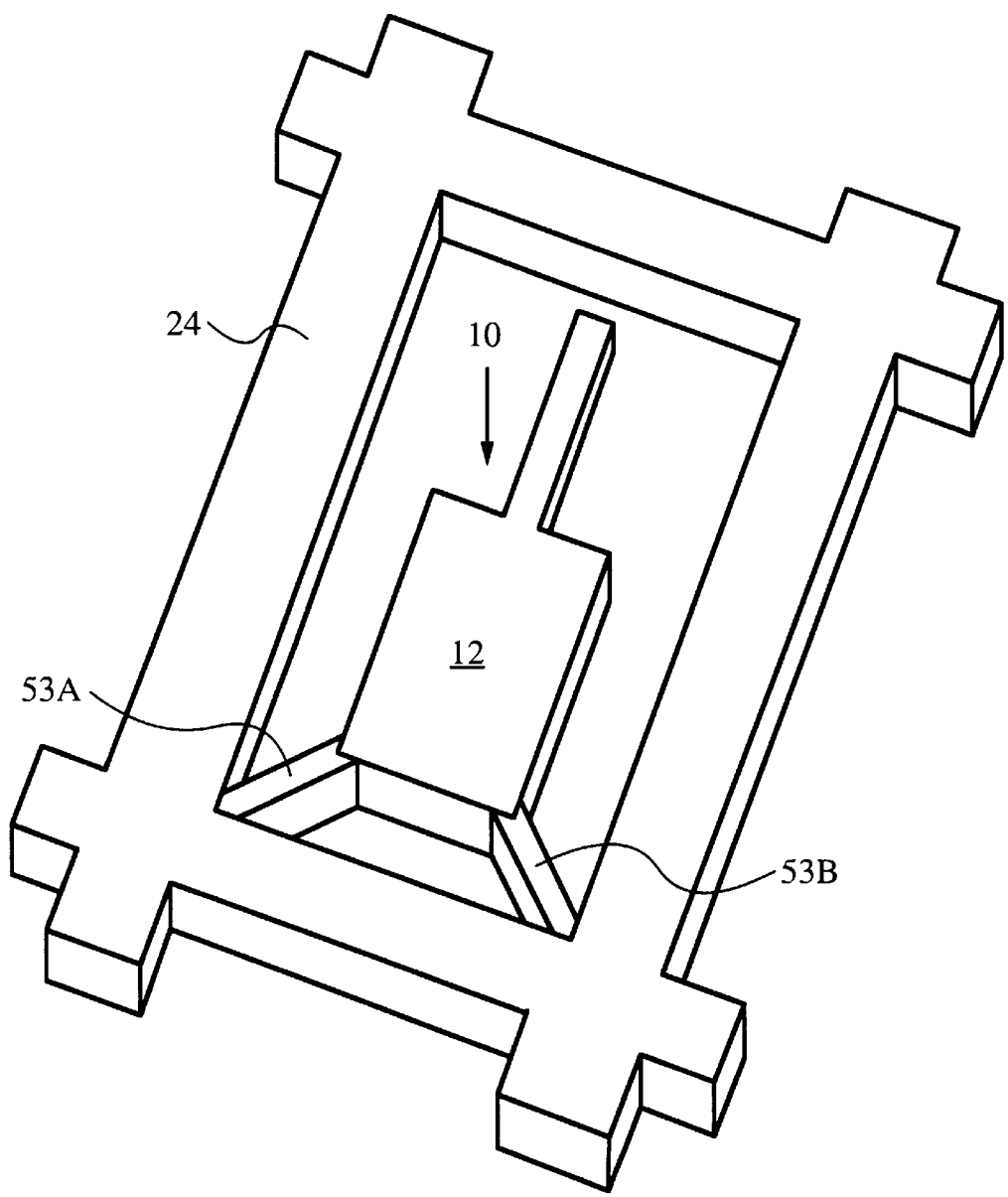
FIG. 21 is a perspective view of a probe held to a wafer with two process tabs according to the invention.

A fourth embodiment of the invention is illustrated in FIG. 21. The fourth embodiment advantageously combines the functions of process tabs 46A and 46B with edge compensation structures 50. Referring to FIG. 18, edge compensation structure 50 emanating from the side of the mounting block opposite the cantilever are chosen to have width greater than W2 such that they will remain intact upon completion of the KOH etching. In the preferred embodiment the width of these two edge compensation structures is 700 $\mu$m for a wafer thickness of 450 $\mu$m. The resulting structures 53A and 53B in FIG. 21 provide the desirable functions of process tabs 46A and 46B and also prevent the two corners of mounting block 12 from being undercut during etching.

A fifth embodiment of the invention is illustrated in FIGS. 22–23. The fifth embodiment differs from the preferred embodiment in that cantilever 14 is produced with a free end 58 having a triangular shape, as shown in FIG. 23. Referring to FIG. 22, a front side mask 54 is produced on top layer 30 in the same manner as previously described in the preferred embodiment. However, front side mask 54 defines a cantilever pattern 56 that differs from the cantilever pattern of the preferred embodiment. Cantilever pattern 56 is shaped such that cantilever 14 is produced with free end 58 having a triangular shape, as shown in FIG. 23. The advantage of triangular shaped free end 58 is that it facilities the viewing of tip 16 during the use of probe 10 in an SPM application.

A fifth embodiment of the invention is shown in FIG. 24. The fifth embodiment adds a step of coating cantilever 14 with a layer of metal 60. Layer of metal 60 improves the reflectivity of cantilever 14 to facilitate laser scanning of cantilever 14 during its use in SPM applications. In one embodiment, layer of metal 60 is a layer of gold. In alternative embodiments, layer of metal 60 is a layer of aluminum or a similarly reflective metal. Specific techniques of coating cantilever 14 with layer of metal 60 are well known in the art.

In accordance with the foregoing aspects of the invention, the height of the tip and cantilever is established by the thickness of the front side silicon layer of the SOI wafer. This advantageously removes reliance on timing a wet chemical etch to establish this critical dimension. Masking to form the tip and cantilever is performed on a surface of substantially uniform height, thereby enabling the tip diameter and cantilever width and length to be accurately established.

Use of the preferred anisotropic etch such as plasma etching provides directional control over the etching process and provides accurate cuts and dimensions. Tip height and cantilever thickness are determined independently as well. Further, the cone angle and point radius of curvature are established separately from any other step. The ability to determine the dimensions of the components of the probe, especially the tip and cantilever, and the accuracy and repeatability of the method of making the probe, can result in a probe that achieves highly accurate and repeatable images of a surface to be mapped.

Although the above description contains many specificities, these should not be construed as limiting the scope of the invention but merely as illustrating some of the presently preferred embodiments. Many other embodiments of the invention are possible. For example, the preferred embodiment describes a method for producing a probe having a cantilever thickness of 4 $\mu$m and a tip height of 6 $\mu$m. These dimensions are for illustrative purposes only. The dimensions of the mounting block, cantilever, and tip may be selected based on the particular application in which the probe will be used.

Additionally, the preferred embodiment describes using a silicon dioxide layer as the insulating layer in the SOI wafer. Many other materials may be used to form the insulating layer, such as silicon nitride, silicon carbide, or doped silicon. Further, the probes produced according to the method of the invention are not limited to use in SPM applications. The method is equally effective for producing probes for a scanning tunneling microscope, field emission assembly, and similar devices.

The foregoing process also can be applied to a cantilever and tip for any type of scanning probe microscopy and also to provide an array of tip assemblies which are capable of effecting a change of state or switching phenomenon in a target surface, such as an array of field emission tip assemblies. Up to now, it has not been possible to produce an array of field emission tip assemblies with reproducibility.

While the invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims.

We claim:

1. A method for making a probe comprising an integral cantilever and tip comprising the steps of:

providing an SOI wafer having a first layer, a second layer and an insulating layer interposed between the first and second layers;

patterning the first layer of the SOI wafer to further define a mounting block;

etching the first layer to the insulating layer;

patterning the second layer of the SOI layer to define a tip and cantilever;

etching the second layer to form said cantilever and tip with an apex, such that the apex of the tip is characterized by substantially atomic sharpness.

2. The method of claim 1 wherein the thickness of the layer on which the cantilever and tip assembly is patterned is substantially equal to the height of the sum of the cantilever and tip heights.

3. The method of claim 1 wherein the first and second layers of the SOI wafer comprise monocrystalline silicon.

4. A method for producing a micro-fabricated probe, said probe comprising a mounting block, a cantilever having a fixed end extending from said mounting block, and an integral tip at a free end of said cantilever, said method comprising the following steps:

a) providing a composite wafer comprising a bottom layer of silicon substrate, a middle layer of etch stop material, and a top layer of silicon substrate;

b) bilaterally coating said composite wafer to form a first layer of masking material on said top layer and a second layer of masking material on said bottom layer;

c) patterning and etching said second masking layer to form a back side mask, said back side mask defining a bottom mounting block pattern;

d) etching said bottom layer to form a bottom section of said mounting block, said etching of said bottom layer automatically terminating at said middle layer;

e) patterning a tip mask in said first layer;

f) partially etching said first layer to define a tip;

g) patterning and etching said first layer to form a front side mask, said front side mask defining a cantilever pattern and a top mounting block pattern;

h) transferring said cantilever pattern and said top mounting block pattern into said top layer by etching said top layer to a depth corresponding to a desired cantilever thickness;

i) further etching said top layer to form a tip column, said cantilever, and a top section of said mounting block, said further etching of said top layer automatically terminating at said middle layer;

j) oxidizing said tip column to further define the tip; and k) removing the oxidized silicon.

5. The method of claim 4, further comprising the step of producing a plurality of edge compensation structures prior to the step of etching said bottom layer, said edge compensation structures providing a means for preserving corners of said bottom section of said mounting block during said etching of said bottom layer.

6. The method of claim 4, comprising the step of providing a layer of silicon dioxide for said middle etch stop layer.

7. The method of claim 4 comprising providing an SOI wafer for the composite wafer.

8. The method of claim 4, further comprising the step of selecting a thickness of said top layer to be in the range of 1 to 2 $\mu$m greater than the sum of desired cantilever thickness and a desired height of said integral tip.

9. The method of claim 4, comprising the step of providing a top layer thickness in the range of 12 to 15 $\mu$m, a middle etch stop layer thickness in the range of 1 to 2 $\mu$m, and a bottom layer thickness in the range of 300 to 500 $\mu$m.

10. The method of claim 4, including the step of providing a layer of silicon dioxide for the first layer of masking material and for the second layer of masking material.

11. The method of claim 4, comprising the step of providing a first outer layer of silicon nitride stacked on a first inner layer of silicon dioxide for the first layer of masking material and providing a second outer layer of silicon nitride stacked on a second inner layer of silicon dioxide for the second layer of masking material.

12. A method for forming a probe from an SOI wafer having a tip with substantially atomic sharpness, supported on a column of a first silicon layer of said SOI wafer comprising the steps of:

a) masking a portion of said first layer to define a tip b) forming a tip column by etching said first layer using a first reactive ion etch with $Cl_2$ and $BCl_3$ as etch gases at a pressure of 30 to 40 mT;

c) using a second reactive ion etch with $SF_6$ and $O_2$ as etch gases at a pressure in the range of 90 to 110 mT to reduce the circumference of said column;

d) using a third reactive ion etch with $Cl_2$ and $BCl_3$ as etch gases at a pressure in the range of 30 to 40 mT to lengthen and further define the tip column; and e) oxidizing the tip to form an apex characterized by substantially atomic sharpness.

13. A method for making a probe comprising an integral cantilever and tip comprising the steps of:

providing a composite SOI wafer having a first silicon layer of a predetermined thickness, a second silicon layer having a predetermined thickness and a layer of etch stop material interposed between the first and second silicon layers;

providing a masking layer over the second silicon layer to define a mounting block;

etching the second silicon layer to form a first section of the mounting block having a thickness terminating automatically at said etch stop layer;

providing a masking layer over said first silicon layer to define a tip and a cantilever, respectively; and etching the first silicon layer to form the tip and cantilever and a corresponding second section of the mounting block such that the thickness of the first layer determines the thickness of the cantilever and height of the tip.

14. A method according to claim 13 including the step of selecting thickness ranges for the first silicon layer, second silicon layer and etch stop layer to correspond to the desired dimensions of the tip, cantilever and mounting block.

15. A method according to claim 13 further including the step of using the SOI wafer and etch stop layer to enable the desired dimensions of the tip, cantilever and mounting block to be determined independently with respect to each other.

16. The method of claim 13 wherein the step of defining the tip further comprises the step of reactive ion etching the first layer with $CHF_3$ and $O_2$ at a pressure in a range of from substantially 10 to 20 mT.

17. The method of claim 13 wherein the step of defining a cantilever in the first layer further comprises etching the first layer by reactive ion etching with $Cl_2$ and $BCl_3$ at a pressure in a range of substantially 30 to 40 mT.

18. A method according to claim 13 further including the step of using one or more process tabs to provide edge compensation to enable formation of a substantially convex corner on said mounting block during etching.

19. A method according to claim 13 fuirther including the step of using one or more process tabs to provide a mounting structure for holding one or more probes in place during processing as well as to provide edge compensation for enabling convex corners to be formed on desired structures during etching.

20. The method of claim 13, further comprising the step of providing a process tab mask on said second silicon layer prior to etching said second silicon layer such that the step of etching said second silicon layer forms one or more process tabs for holding said probe in said SOI wafer during the production of said probe.

21. A method for making a probe for imaging a surface as for effecting a change in state at substantially the atomic level comprising the steps of:

providing a SOI wafer comprising two single crystal silicon layers and a silicon dioxide layer interposed between said two single crystal silicon layers;

forming a mounting block by anisotropic chemical etching of a selected portion of the SOI wafer;

forming a tip assembly integral with a cantilever extending from the mounting block, by reactive ion etching a layer of single crystal silicon such that the cantilever has a free end supporting the tip assembly and a fixed end integral with the mounting block; and forming a plurality of compensation structures for preserving corners of said mounting block during etching and for providing attachment points between said probe and the SOI wafer from which the probe is formed.

* * * * *